United States Patent
Adami et al.

(10) Patent No.: US 11,422,536 B2
(45) Date of Patent: Aug. 23, 2022

(54) PREDICTIVE DIAGNOSTICS METHOD FOR A CORRUGATED BOARD PRODUCTION PLANT

(71) Applicant: FOSBER S.P.A., Pescaglia (IT)

(72) Inventors: Mauro Adami, Viareggio (IT); Marco Imposti, Capannori (IT); Gianluca Berrettini, Gragnano (IT)

(73) Assignee: Fosber S.p.A., Pescaglia (IT)

( * ) Notice: Subject to any disclaimer, the term of this patent is extended or adjusted under 35 U.S.C. 154(b) by 83 days.

(21) Appl. No.: 16/644,196

(22) PCT Filed: Sep. 4, 2018

(86) PCT No.: PCT/EP2018/073781
§ 371 (c)(1),
(2) Date: Mar. 4, 2020

(87) PCT Pub. No.: WO2019/048437
PCT Pub. Date: Mar. 14, 2019

(65) Prior Publication Data
US 2021/0373535 A1 Dec. 2, 2021

(30) Foreign Application Priority Data
Sep. 7, 2017 (IT) .................. 102017000100484

(51) Int. Cl.
*G05B 19/418* (2006.01)
(52) U.S. Cl.
CPC ... *G05B 19/4183* (2013.01); *G05B 19/41865* (2013.01); *G05B 19/41885* (2013.01)

(58) Field of Classification Search
CPC .......... G05B 19/4183; G05B 19/41865; G05B 19/41885
See application file for complete search history.

(56) References Cited

U.S. PATENT DOCUMENTS

| | | |
|---|---|---|
| 5,829,951 A | 11/1998 | Adami |
| 5,951,454 A | 9/1999 | Adami |
| 6,092,452 A | 7/2000 | Adami |
| 6,165,117 A | 12/2000 | Adami |
| 6,684,749 B2 | 2/2004 | Adami |
| 6,714,223 B2 | 3/2004 | Asami et al. |

(Continued)

FOREIGN PATENT DOCUMENTS

| | | |
|---|---|---|
| EP | 1362691 A2 | 11/2003 |
| EP | 1710183 A1 | 10/2006 |

(Continued)

*Primary Examiner* — Christopher E. Everett
(74) *Attorney, Agent, or Firm* — Breiner & Breiner, L.L.C.

(57) ABSTRACT

A new method is disclosed for monitoring the operation of a corrugated board production plant, the method provides for detecting at least one operational parameter of a functional unit of the plant, for example a current absorbed by a motor. Then, the current value of a statistical function of the operational parameter is calculated in a current temporal window. The maximum value and the minimum value of the same statistical function are calculated based on historicized data of the operational parameter in question. By comparing the current value of the statistical function and the maximum and minimum values, a piece of information of predictive diagnostics is obtained.

14 Claims, 10 Drawing Sheets

(56) References Cited

U.S. PATENT DOCUMENTS

| | | |
|---|---|---|
| 6,722,243 B2 | 4/2004 | Adami |
| 7,291,243 B2 | 11/2007 | Adami |
| 8,342,068 B2 | 1/2013 | Adami |
| 2004/0030426 A1* | 2/2004 | Popp .................... G06T 7/0004 700/97 |
| 2004/0083018 A1* | 4/2004 | Dollevoet ......... A61F 13/15772 700/109 |
| 2007/0067678 A1* | 3/2007 | Hosek ................... G06F 11/008 714/25 |
| 2007/0260374 A1* | 11/2007 | Morrison ................ F02D 41/22 701/99 |
| 2008/0127467 A1* | 6/2008 | Hirano .............. H01L 21/67265 29/25.01 |
| 2010/0163154 A1* | 7/2010 | Masuda ................. B65H 26/02 156/64 |
| 2012/0193026 A1 | 8/2012 | Adami |

FOREIGN PATENT DOCUMENTS

| | | |
|---|---|---|
| EP | 2119559 A1 | 11/2009 |
| WO | 2004014277 A2 | 2/2004 |
| WO | 2007120785 A1 | 10/2007 |

\* cited by examiner

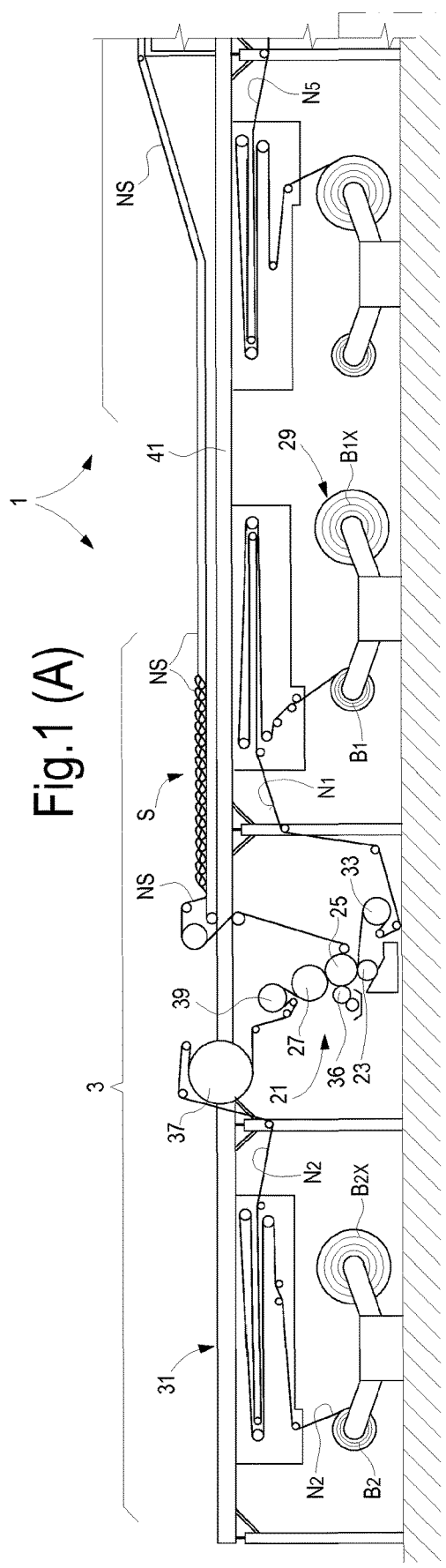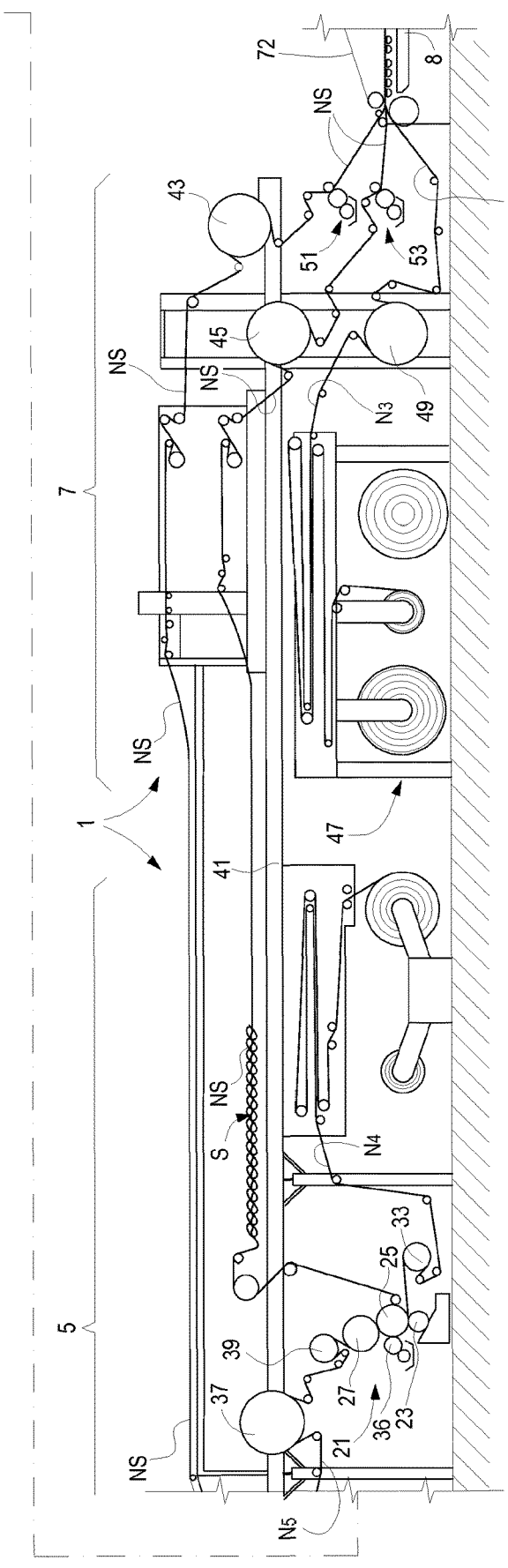

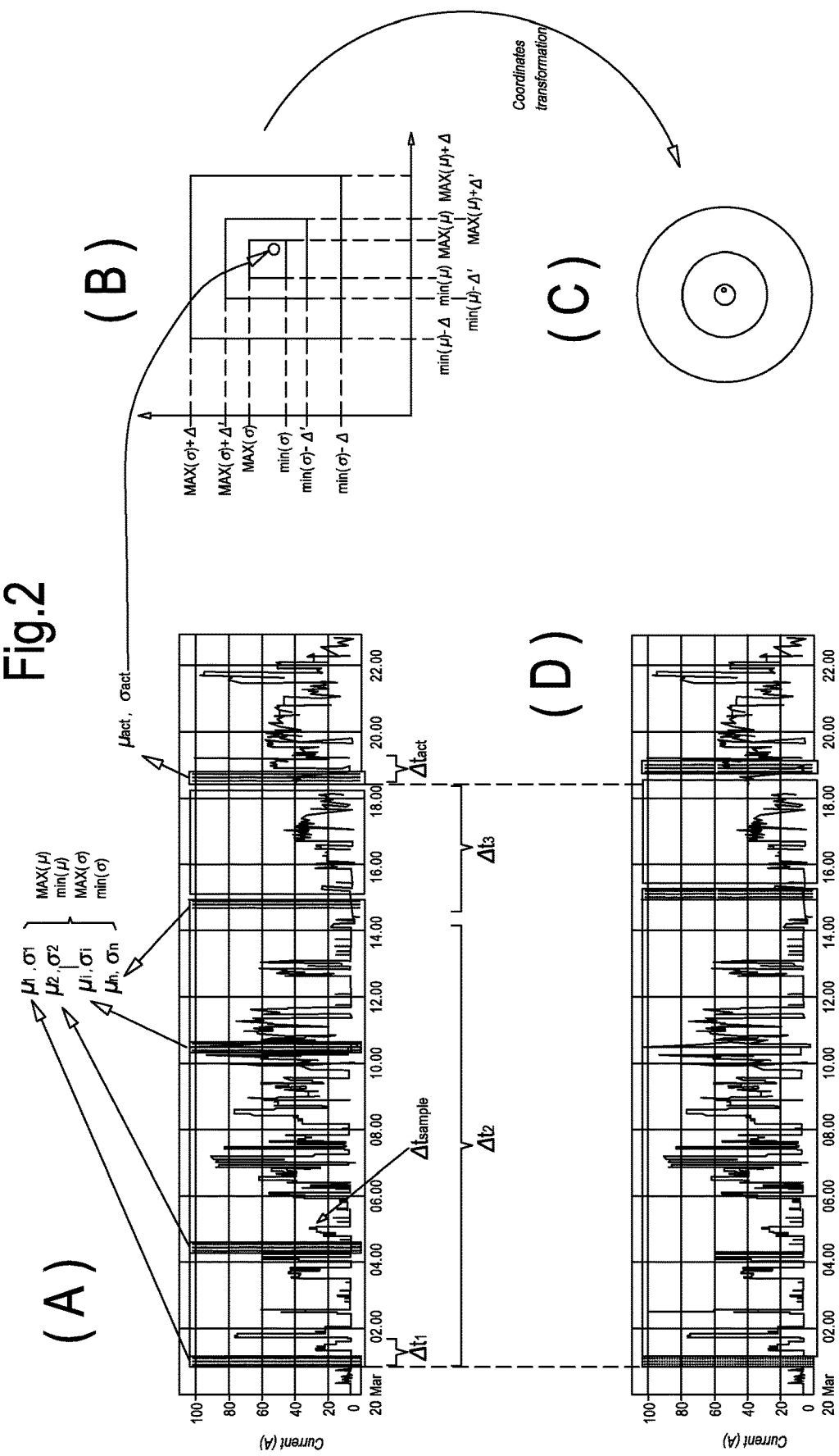

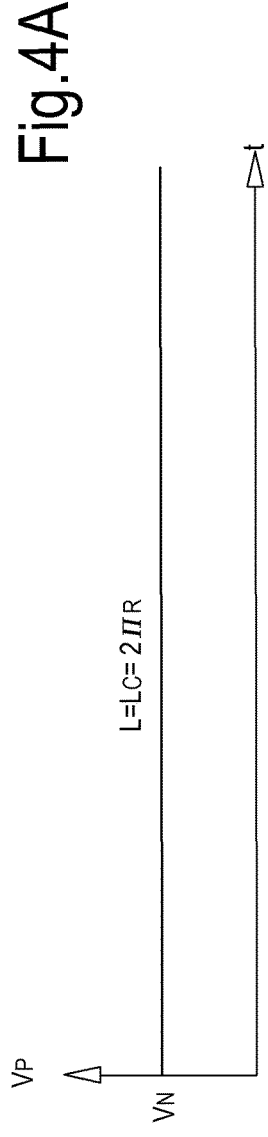
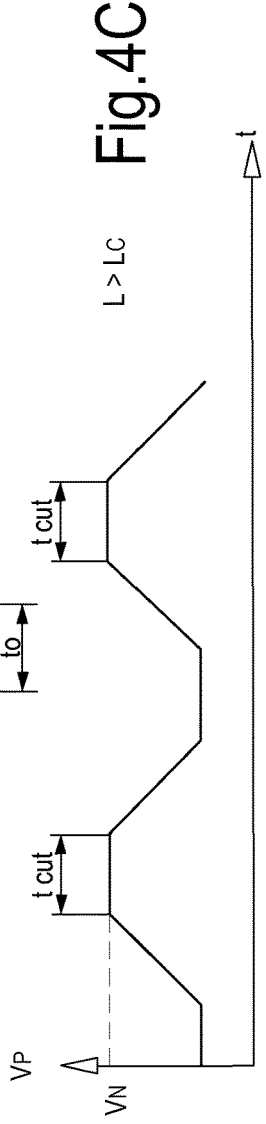
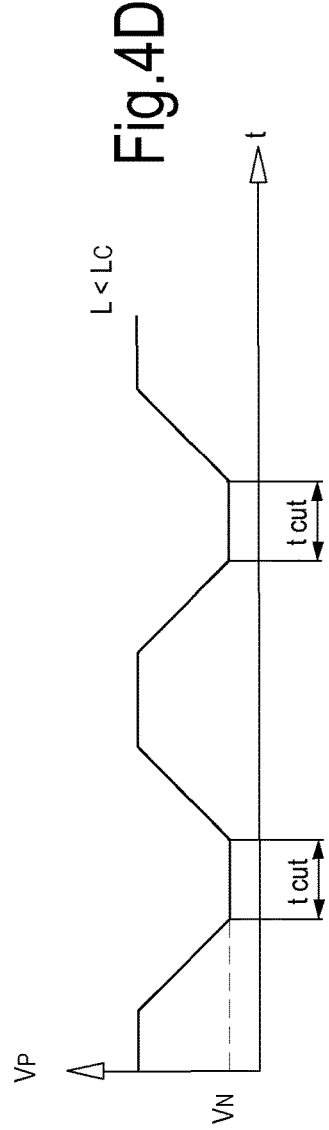
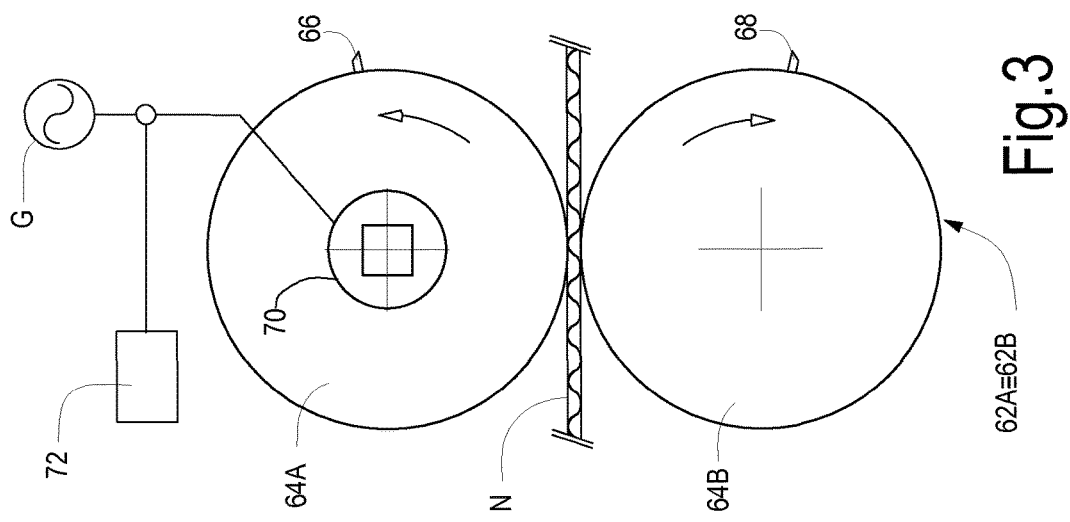

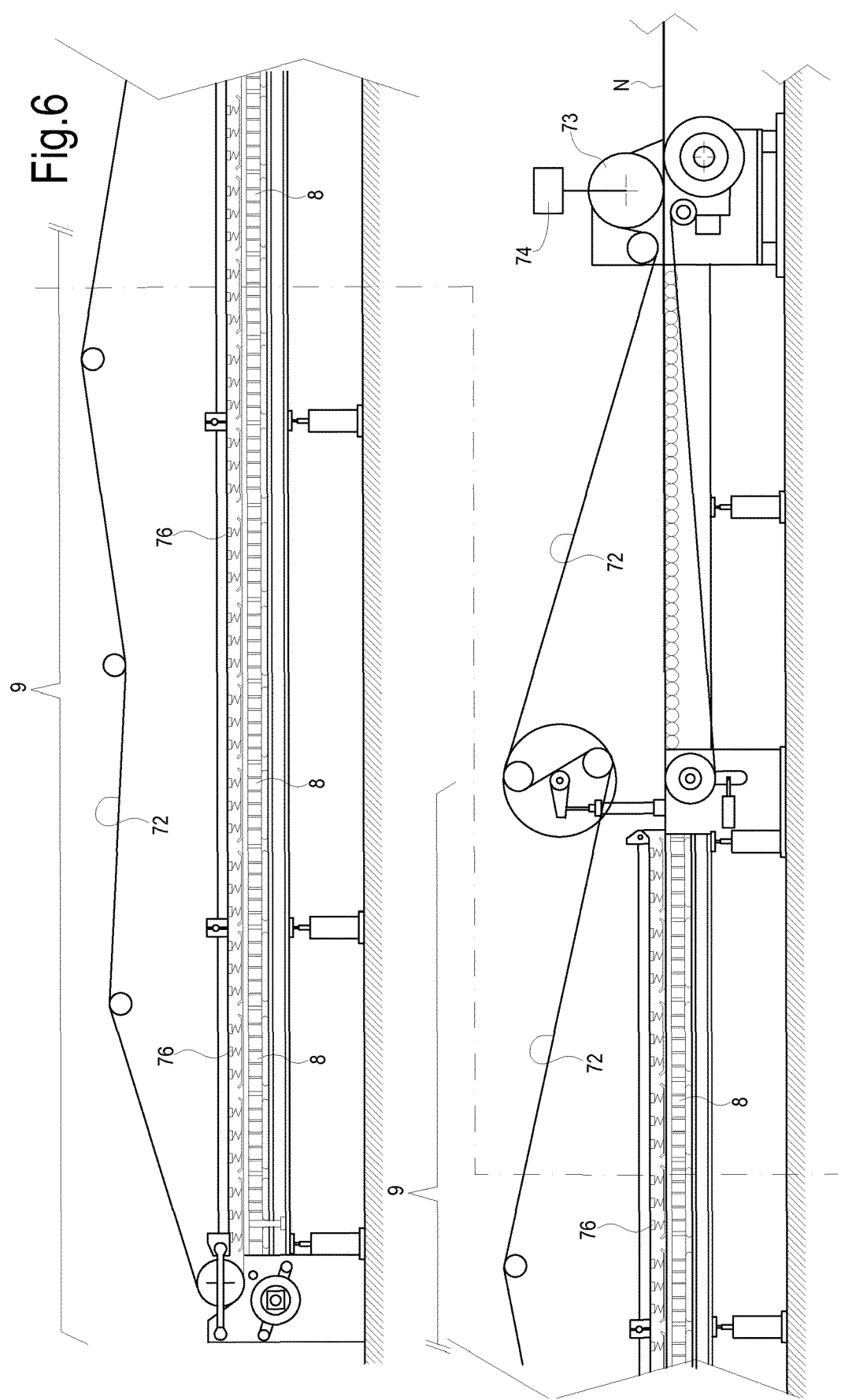

Fig.9
(A)
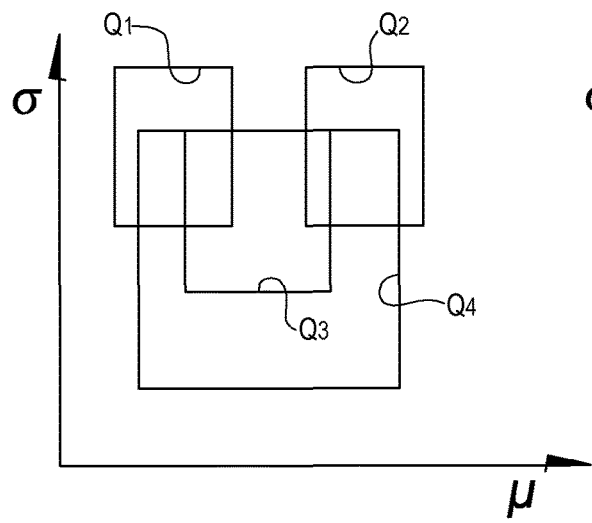
(B)
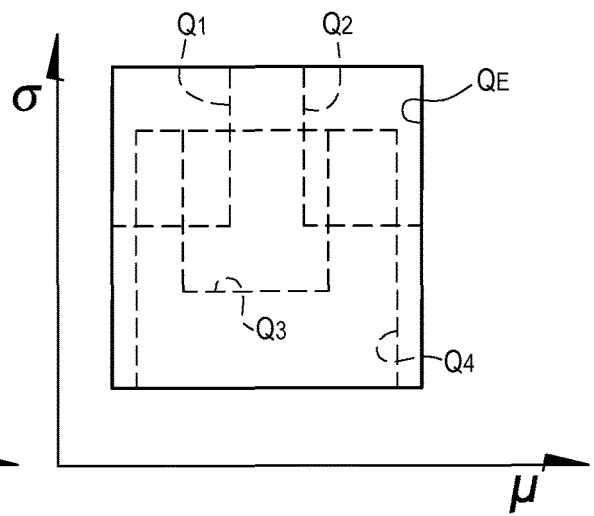
(C)
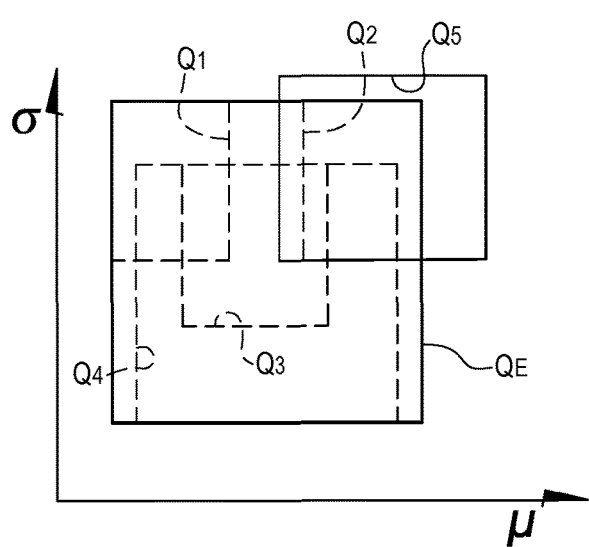
(D)
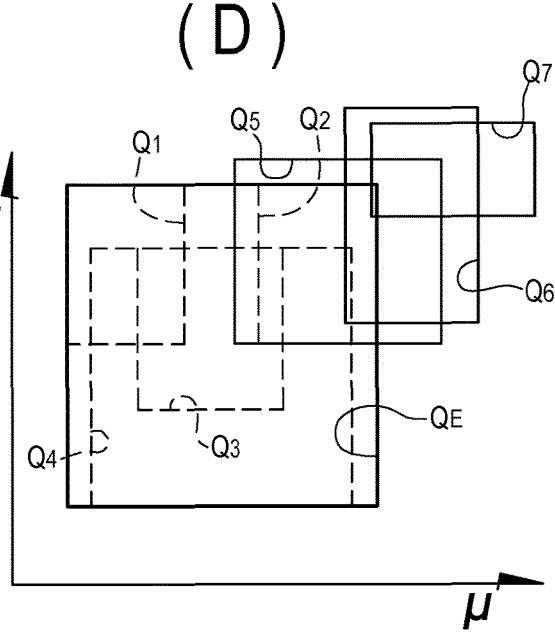

Fig.9
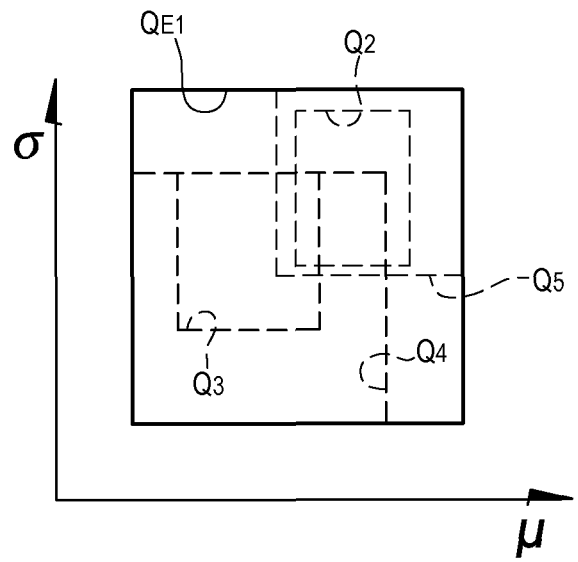
(E)
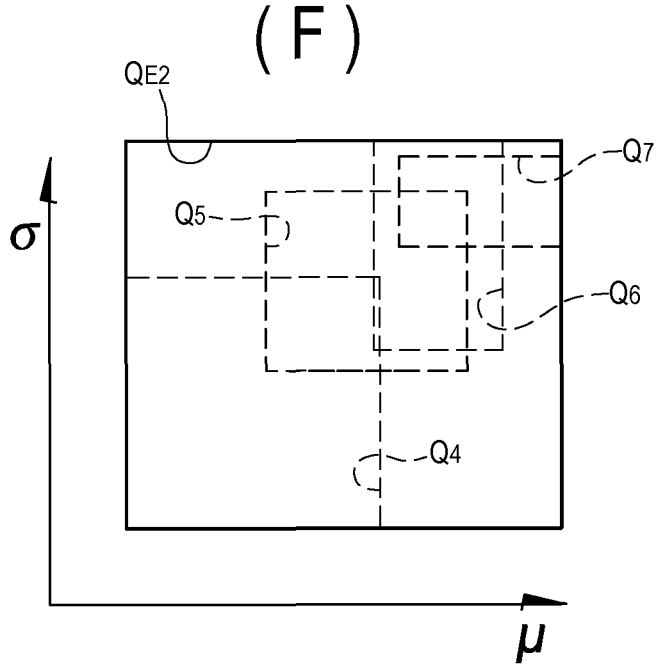
(F)

PREDICTIVE DIAGNOSTICS METHOD FOR A CORRUGATED BOARD PRODUCTION PLANT

TECHNICAL FIELD

The present invention relates to the corrugated board production plants. More in particular, the present invention relates to predictive diagnostics methods for functional components or units of the corrugated board production plants.

Background Art

The corrugated board is produced from sheets of flat paper fed by master rolls. Corrugated board usually consists of at least one corrugated paper sheet and two flat paper sheets, so-called liners, between which the corrugated paper sheet is arranged. The liners are glued to the corrugated paper sheet at the tops or crests of the flutes. Generally speaking, a corrugated board may comprise more than one corrugated paper sheet. Usually, a flat paper sheet is arranged between each pair of corrugated paper sheets.

A corrugated board production plant generally comprises one or more unwinders for unwinding rolls of continuous webs or sheets of flat paper, and one or more corrugators. Each corrugator converts a continuous sheet of flat paper into a continuous sheet of corrugated paper and bonds the continuous sheet of corrugated paper to a continuous sheet of flat paper, so-called liner. The composite continuous sheet exiting from the corrugator is fed to a double facer, where a second liner is glued thereto. In general, the plant may comprise one or more corrugators to feed one or more sheets, consisting of a continuous corrugated paper sheet and a liner, to the double facer. The plant further comprises a section where the corrugated board from the double facer is processed, this section being called dry-end, in order to distinguish it from the section (so-called wet-end) comprising the machines from the unwinders to the double facer. The dry-end section usually comprises a longitudinal slitting and scoring station, where the corrugated board sheet is cut into continuous longitudinal strips.

The continuous longitudinal strips are further processed in order to produce a series of separate sheets, or a so-called fanfold, i.e. a strip folded in zigzag fashion according to transverse cutting and creasing lines.

The plants of this kind comprise a plurality of functional units of various type. For instance electric motors, pumps, steam systems, glue feeder, pressurized air systems, etc. are provided.

The functional units are likely to be affected by wear, and can break. The interventions for maintaining, repairing or replacing the functional units of a line can be very expensive, as there could be the need for stopping the line for even a long time. Downtimes result in production losses affecting the overall production costs. Taking into account that the profit margin for the produced material (corrugated board) are very small, an increase in costs due to production losses resulting from repair or maintenance downtimes could be very onerous for the users. Moreover, stopping the wet-end section results in significant wastes and long restart times, as the corrugated board that is still in the machine shall be completely discharged and rejected and the hot sections (corrugators, double facer) shall be brought again to the right temperature before starting the production again.

Therefore a need for improving the corrugated board production lines and plants exists, in order to overcome, at least partially, the drawbacks of the current art, especially as regards the repair and maintenance costs.

SUMMARY OF THE INVENTION

According to one aspect, a method for monitoring the operation of a corrugated board production plant is provided, comprising the following steps:
  detecting at least one operational parameter of a functional unit of the plant and calculating a current value of at least a first statistical function of said parameter in a current temporal window;
  calculating a maximum value and a minimum value of the first statistical function based on historicized data of the operational parameter;
  comparing the current value of the first statistical function and said maximum value and said minimum value of said first statistical function calculated on said historicized data;
  generating a piece of information of predictive diagnostic based on the result of said comparison.

In an improved embodiment of the invention, two statistical functions are used in combination. In this case, the method can be implemented by performing all the steps thereof for each of the two (or more) statistical functions.

Practically, the historicized data of the operational parameter, based on which the values of the statistical function(s) are calculated, the maximum and minimum value of which are then calculated, can be contained within a movable learning temporal window. The movable temporal window translates over time, so as to contain values of the operational parameter acquired over time, for example through suitable sensors.

Practically, the learning temporal window translates along a time ordinate, so that the maximum and minimum values of the statistical function(s) are not set once and for all based on an initial learning step performed only once. Vice versa, the learning process is updated, i.e. the learning temporal window (whose data are used to determine the maximum and minimum values of the statistical function(s) for the following comparison with the current data) continuously stores the most recent data, discharging the older ones. The time advancing step can be suitably selected simply based on design considerations.

The statistical functions can be calculated on time intervals, or calculating windows, into which the movable learning temporal window is subdivided. For example, the movable learning temporal window can be subdivided into a plurality of N calculating windows for calculating the statistical functions. The movable learning temporal window can temporally advance by steps equal to the duration of the calculating window. In this case, at every temporal step, the values of the oldest calculating window are discarded, while the data contained in the new calculating window are acquired, corresponding to the temporal step done by the movable learning temporal window.

The current temporal window, based on which the current statistical function(s) are calculated, may have the same duration as each statistical function calculating window into which the movable learning temporal window is subdivided.

As better explained below, for a more effective operation of the system, the current temporal window is temporally distanced from the movable learning temporal window.

A method is also disclosed herein for monitoring the operation of a corrugated board production plant, the method comprising the following steps:

(a) calculating a maximum value and a minimum value of at least one statistical function of an operational parameter of a functional unit in a movable learning temporal window;
(b) calculating a current value of the statistical function of the operational parameter of the functional unit in a current temporal window, temporally following and distanced from the movable learning temporal window;
(c) comparing the current value of the statistical function and the maximum value and the minimum value of the statistical function calculated on the movable learning temporal window;
(d) generating a piece of information of predictive diagnostics based on the result of said comparison;
(e) time-translating the movable learning temporal window and the current temporal window;
(f) repeating the steps from (a) to (e).

As better described below with reference to a plurality of embodiments, the functional unit can be any element or component of the plant, or a set or sub-set of elements or components, which shall be suitably checked for diagnostic-predictive purposes.

Firstly, a functional unit can be an electric motor, or a unit comprising an electric motor and components associated therewith, such as the motor drive, the actuators, the kinematic chain(s) moved by the motor, etc.

A functional unit can also be a component of a kinematic chain, or a bearing, such as a hydrostatic, hydrodynamic or rolling bearing, or a set of these components. Functional units can also be, or may comprise, movable members, such as longitudinal knives (for example disc-shaped rotating knives), or transverse knives (such as transverse shears) or creasing tools. A functional unit can be also constituted by one or more heating rollers, guide rollers and return rollers, drawing rollers, brakes of unwinders, splicers and parts thereof, ducts for pressurized air, steam, oil or other fluids, pressure rollers, corrugating rollers, double facer hot plates, conveyors, stackers (up-stackers and down-stackers), etc. In general, the functional units can comprise any member, component, element or combination thereof, that are subject to wear or consumption, and that can absorb or supply mechanical power, exert pressure, thrust or traction, absorb or supply fluids (including oil, water, steam, glues), generate vibrations, etc.

BRIEF DESCRIPTION OF THE DRAWINGS

The invention will be better understood by following the description and the accompanying drawing, which shows a non-limiting example of embodiment of the invention. More in particular, in the drawing:

FIGS. 2(A), 2(B), 2(C), and 2(D) show exemplary diagrams illustrating the predictive diagnostics method disclosed herein;

FIG. 3 schematically illustrates a shearer for transversely cutting the continuous corrugated board into single sheets;

FIGS. 4A-4D show diagrams of the operation of the shearer of FIG. 3;

FIG. 6 shows an enlargement of the double facer section of the corrugated board production line, in an embodiment;

FIGS. 9A-9F show a diagram of the trend of statistical functions calculated in subsequent time intervals, in case of drift of the values of these functions.

DETAILED DESCRIPTION OF EMBODIMENTS

Figure 1:
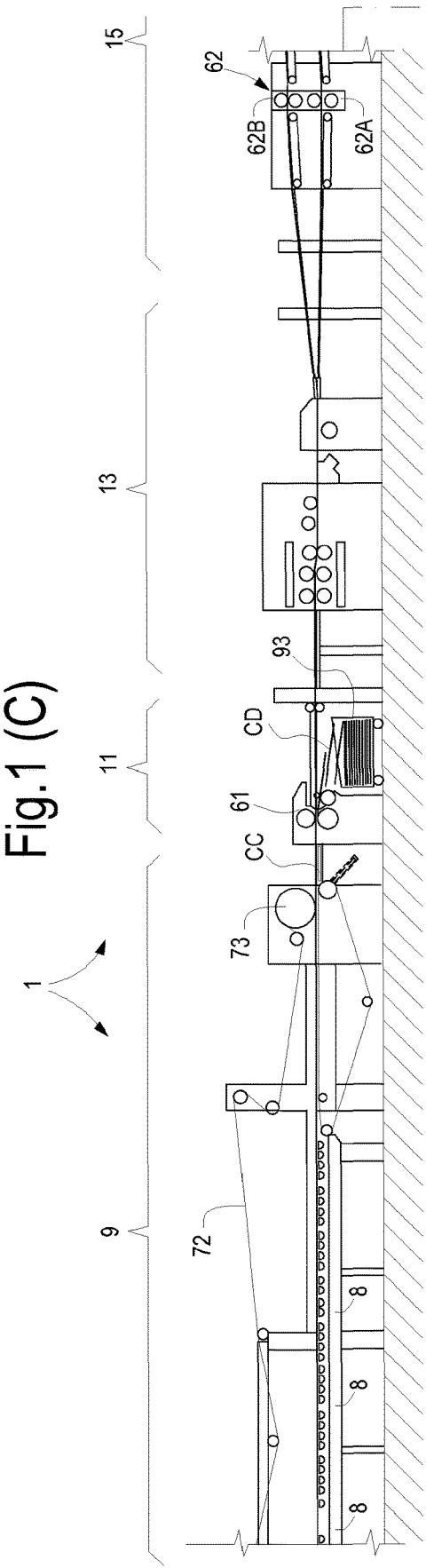
FIGS. 1A, 1B, 1C, and 1D show portions of a corrugated board production plant, which are arranged in sequence along the board feeding path.
Figure 1:
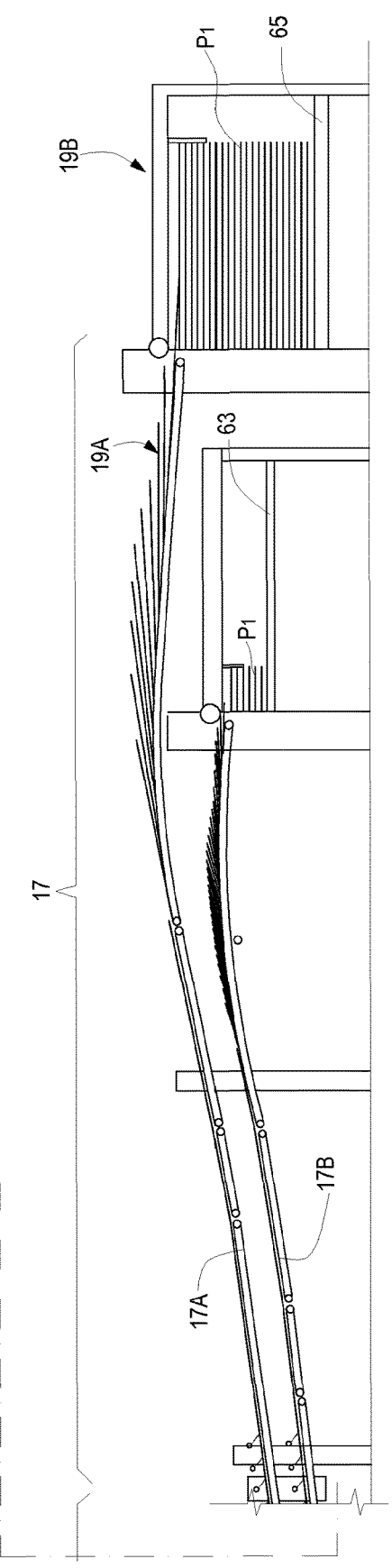
Figure 5A:
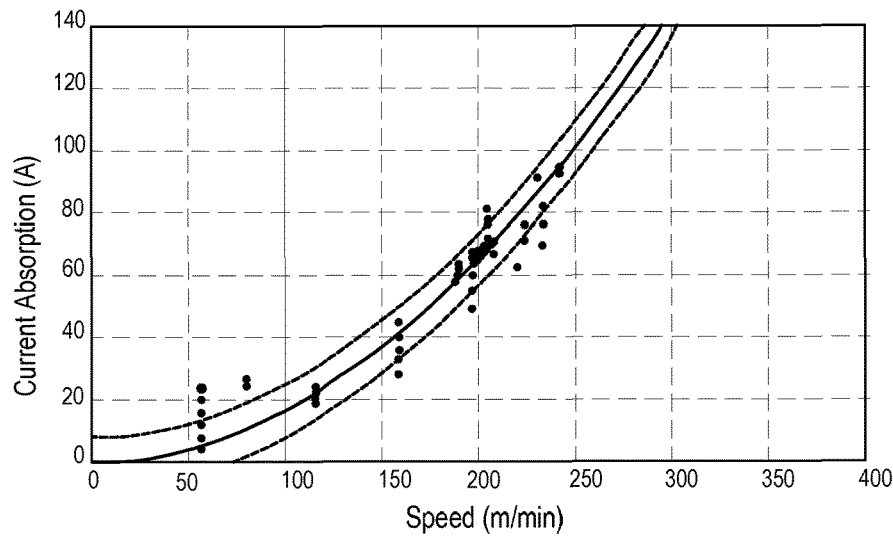
FIGS. 5A-5F show diagrams of the diagnostics method applied to the shearer of FIG. 3.
Figure 5B:
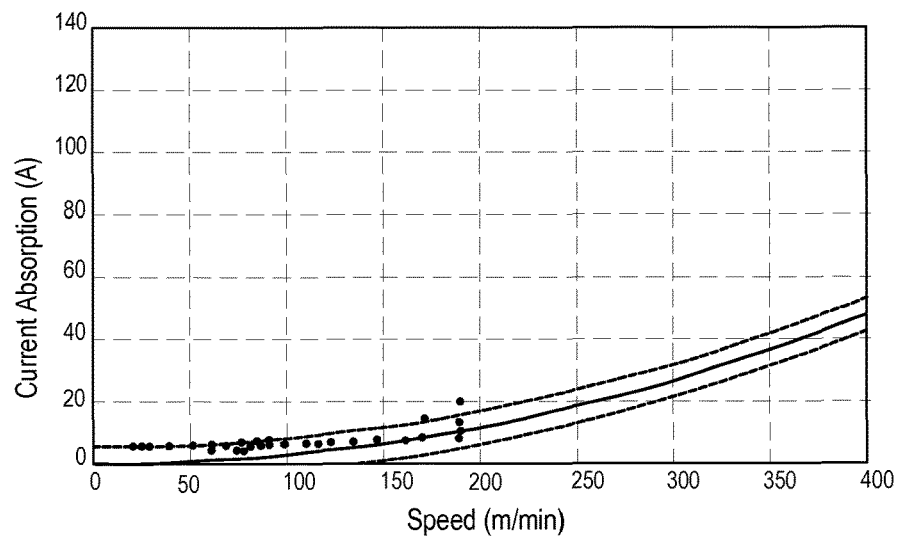
Figure 5C:
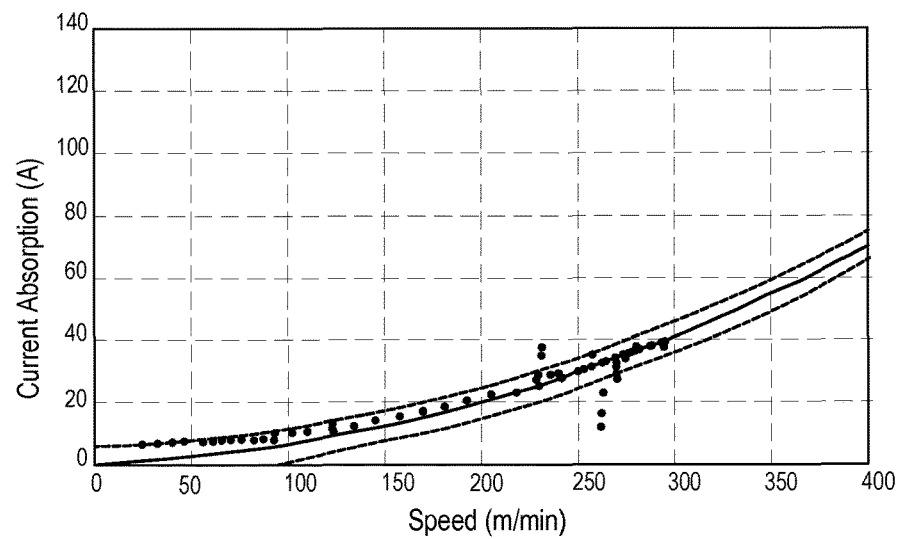
Figure 5D:
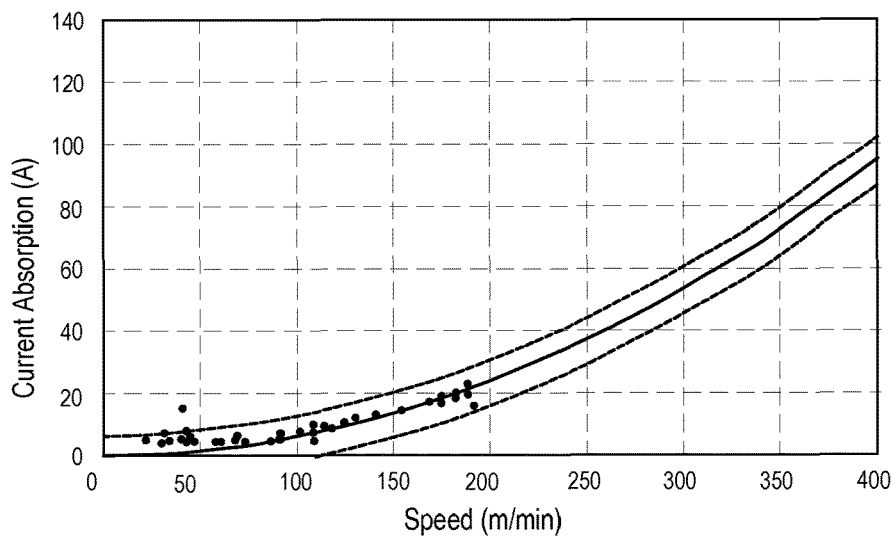
Figure 5E:
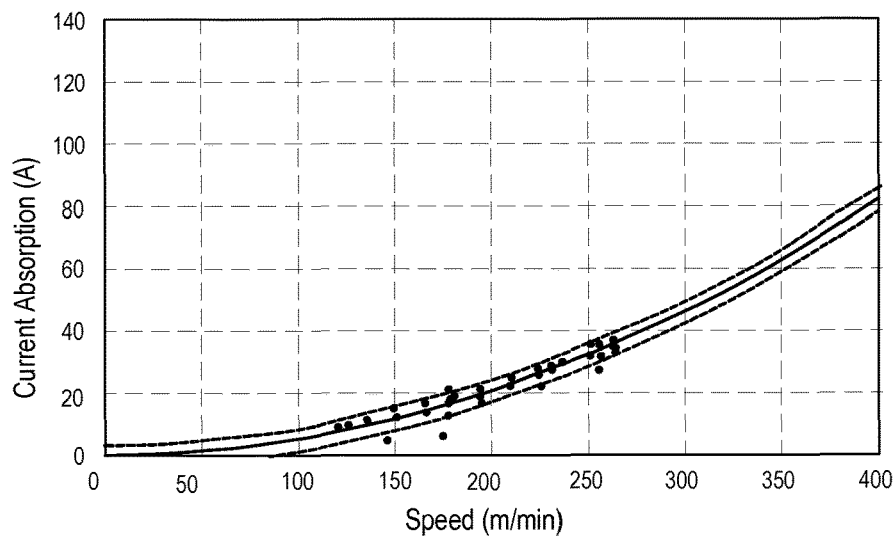
Figure 5F:
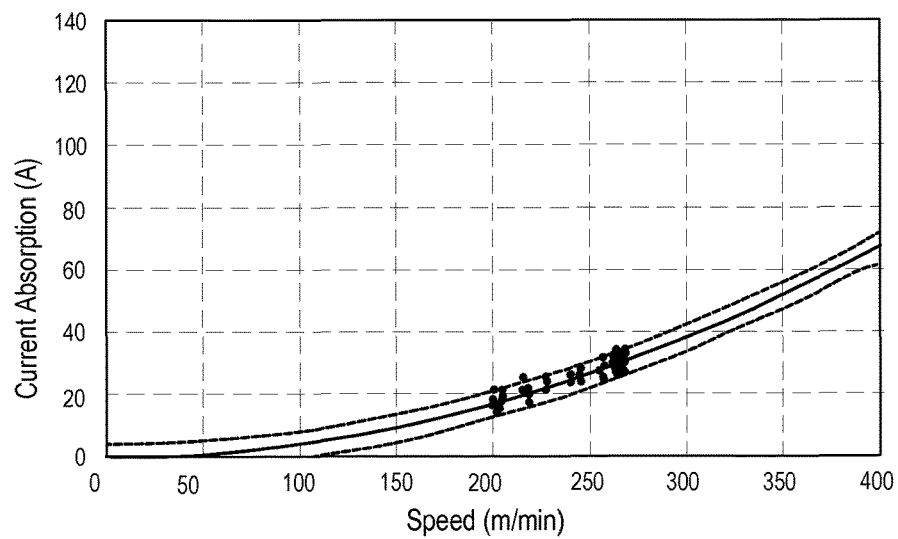

The detailed description below of exemplary embodiments is made with reference to the attached drawings. The same reference numbers in different figures identify equal or similar elements. Moreover, the drawings are not necessarily to scale. The detailed description below does not limit the invention. The scope of protection of the present invention is defined by the attached claims.

In the description, reference to "an embodiment" or "the embodiment" or "some embodiments" means that a particular feature, structure or element described with reference to an embodiment is comprised in at least one embodiment of the disclosed subject matter. The sentences "in an embodiment" or "in the embodiment" or "in some embodiments" in the description do not therefore necessarily refer to the same embodiment or embodiments. The particular features, structures or elements can be furthermore combined in any suitable way in one or more embodiments.

In the illustrated embodiment, a plant is disclosed for the production of double-wall corrugated board sheets, that is with two sheets of corrugated paper, so-called fluted paper, interposed between two flat paper sheets, so-called liners, and an intermediate sheet interposed between the two fluted paper sheets. Moreover, the plant is configured to provide two stacks of sheets on two adjacent stacking devices.

However, it should be understood that the features described hereunder, related to the predictive diagnostics system and method, may be used also in plants provided with a different number of corrugators, and thus adapted to produce a corrugated board sheet comprising a different number of sheets. Also the stacking systems may be different, for example they can be adapted to form only a single stack or more than two stacks of board sheets. In other embodiments, the stacking systems can provide for means for fan-folding the corrugated board sheet without cutting it into single sheets.

Similarly, the double facer and the longitudinal cutting and creasing station, disclosed hereunder just by way of example, may be configured differently from what described and illustrated herein.

With reference to the attached drawing, the plant comprises a first section 3 for producing a first single-faced corrugated board sheet, a second section 5 for producing a second single-faced corrugated board sheet, a third section 7 for feeding the two single-faced corrugated board sheets together with a flat paper sheet to a double facer 8 of a section 9 comprising the double facer 8 and the corresponding accessories. From section 9 a composite corrugated board sheet is delivered, formed by the set of the single-faced corrugated board sheets and of the further flat paper sheet glued thereto, this flat paper sheet forming a second liner of the composite corrugated board sheet.

Downstream of section 9 a section 11 is provided, in which devices are arranged for removing trimmings, and downstream of section 11, a section 13 is provided for longitudinally cutting and creasing the corrugated board sheet coming from the section 9 containing the double facer 8, in order to separate the corrugated board sheet into a plurality of longitudinal strips of corrugated board and to form creasing lines along the longitudinal extension of the single longitudinal strips of continuous corrugated board.

In the illustrated embodiment, the plant 1 also comprises, just by way of example, a section 15 for transversely cutting the corrugated board strips coming from section 13, a double conveyor 17, and two areas 19A and 19B for stacking the board sheets cut in section 15 and fed by means of the double conveyor 17.

A first corrugator 21 is arranged in section 3. Corrugators usable for producing a single-faced corrugated board sheet are known per se. Only the main elements of the corrugator will be described hereunder, the corrugator being for example as that disclosed in U.S. Pat. No. 8,714,223 or in EP 1362691, the content whereof is incorporated in the present description.

Briefly, the corrugator 21 may comprise a first corrugating roller 23 co-acting with a second corrugating roller 25 and a pressure roller 27, or other pressure member, to bond a flat paper sheet and a corrugated board sheet together, as described hereunder. A first flat or smooth paper sheet N1 is fed to the corrugator 21 from a first unwinder 29. The unwinder 29 may be configured in a known manner and will not be described in detail. The unwinder 29 may comprise two positions for a first unwinding reel B1, from which the first smooth paper sheet N1 is supplied, and a second waiting reel B1X, which will be unwound when the reel B1 is exhausted.

A second smooth paper sheet N2 is unwound from a second unwinder 31, which can be substantially equal to the unwinder 29, and onto which a first reel B2, from which the paper sheet N2 is unwound, and a second waiting reel B2X are arranged, the waiting reel B2X starting to be unwound when the reel B2 is exhausted.

The first smooth paper sheet N1 is fed to the corrugating roller 23, after having been passed around a heating roller 33. The arc of contact of the paper sheet N1 around the heating roller 33 can be adjusted in order to transfer to the smooth paper sheet N1 a greater or lower amount of heat coming from inside the heating roller 33, for example heated with steam circulating inside itself.

The first smooth paper sheet N1 is corrugated passing through the nip formed between the corrugating rollers 23 and 25. In this way, a corrugated paper sheet N1 is obtained at the exit from the nip between the corrugating rollers 23 and 25. A suitable glue is applied to the flutes formed on the corrugated paper sheet by means of a gluing unit 35, so that the corrugated paper sheet N1 can be glued onto the smooth paper sheet N2 fed, together with the corrugated paper sheet N1, through the nip formed between the second corrugating roller 25 and the pressure roller 27.

The gluing unit 35 may comprise an application roller 36, in contact with the flutes of the corrugated paper sheet N1 driven around the second corrugating roller 25. The application roller 36 receives the glue from a distributing roller or screened roller 38, which takes glue from a tank 40 or similar. The distance between the rollers 36 and 38 can be adjusted, to adjust the amount of glue applied to the corrugated paper sheet N1.

In some embodiments, the second smooth paper sheet N2 may be fed around one or more rollers 37, 39 arranged between the unwinder 31 and the corrugator 21, in order to be heated. The arc of contact between the smooth paper sheet N2 and any one or both of the rollers 37, 39 can be modified in order to vary the amount of heat transferred by the roller(s) 37, 39 to the smooth paper sheet N2 before it comes into contact with the pressure roller 27. Also the pressure roller 27 can be heated internally to glue the paper sheets N1 and N2 in conditions of high pressure and high temperature.

At the output of the corrugator 21, a single-faced corrugated board sheet NS is obtained, formed by the first corrugated paper sheet N1 and the second smooth or flat paper sheet N2, as shown in the enlargement of FIG. 2. The flutes or crests O formed on the first paper sheet N1 are glued by means of a glue C, applied by the gluing unit 35 to the waves O, onto the surface of the smooth paper sheet N2 facing the corrugated paper sheet N1.

Downstream of the corrugator 21 a bridge 41 is arranged, which extends towards the section 5 and the following sections 7 and 9 of the plant 1. On the bridge 41, a stock S of single-faced corrugated board sheet NS can be formed, with the formation of suitable accumulation folds, so that the operating speed of the corrugator 21 can be made, at least partially, independent of the operating speed of the downstream sections.

The single-faced corrugated board sheet NS is then fed along a first path which develops above the bridge 41 up to a heating roller 43, around which the single-faced corrugated board sheet NS can be wound for an adjustable arc, in order to be appropriately heated before reaching the double facer 8 of section 9.

In the illustrated embodiment, the plant 1 comprises a second section 5 substantially equal to the section 3, where a second single-faced corrugated board sheet, still indicated with NS, is formed, by means of a further pair of paper sheets N4, N5 coming from unwinders similar to the unwinders 29 and 31, and a corrugator similar to the corrugator 21. This second single-faced corrugated board sheet NS is fed to the bridge 41 to form a stock S and be fed towards the double facer 8 of the section 9, being wound around a heating roller 45, substantially equivalent to the heating roller 43.

In other embodiments, the section 5 can be omitted, as well as the respective corrugator. Vice versa, in further embodiments, more than two sections 3, 5 may be provided, with respective corrugator and unwinder of the paper sheets to form respective single-faced corrugated board sheets NS, which are then glued together by means of the double facer 8 of section 9.

A smooth or flat paper sheet N3 is unwound from a further unwinder 47 and fed, preferably passing around a heating roller 49, to the double facer section 9. Gluing units 51, 53 apply, in a known manner, a glue to the flutes of the respective corrugated paper sheet of the two single-faced corrugated board sheets NS, to glue them together and with the smooth paper sheet N3, which will form the second liner of the composite corrugated board CC coming out from section 9, the first liner being formed by the smooth paper sheet N2.

The section 9 containing the double facer can be configured in a known manner and will not be described in detail herein. Examples of embodiments of the double facer are disclosed in U.S. Pat. No. 7,291,243 and in US 2012/0193026, the content whereof is incorporated in the present description and which can be referred to for greater details of embodiment of this section of the plant.

In section 11, a transverse rotary shear 61 is arranged, which can perform transverse cuts to sever, completely or partially, the composite corrugated board CC fed from section 9. The transverse rotary shear 61 may be configured for example as disclosed in U.S. Pat. No. 6,722,243, the content whereof is incorporated in the present disclosure. As described in greater detail below, the transverse rotary shear 61 can be used, in particular, to remove portions of corrugated board CC where there are gluing defects or other defects.

The composite corrugated board CC, fed through the slitting and scoring section 13, is divided into strips which can be deviated along two paths defined by the two conveyors 17A, 17B of section 17. Section 13 can be configured in a known manner, for example as disclosed in U.S. Pat. Nos. 5,951,454, 6,165,117, 6,092,452, 6,684,749, 8,342,068 or in other prior art documents mentioned in the above mentioned patent documents, the content whereof is incorporated in the present disclosure.

The two conveyors 17A, 17B convey corrugated board sheets obtained by transversely cutting the continuous strips of composite corrugated board in section 15, in order to form stacks P1, P2 on collection planes 63, 65, known and configured for example as disclosed in EP 1710183, U.S. Pat. No. 5,829,951, or in other patent documents mentioned in these patents, the content whereof is incorporated in the present description. Number 62 indicates a station for transversely cutting the continuous strips of composite corrugated board coming from the longitudinal slitting and scoring section 13. The station 62 comprises transverse shearers 62A, 62B, subdividing each continuous strip coming from the section 13 into single sheets of given length. The line can comprise a transverse shearer 62A, 62B for each conveyor 17A, 17B.

Each section or station of the plant 1 briefly described above comprises one or more functional units, each of which can be supplied with electricity, pressurized air, steam, glue or other material or fluid, or combinations thereof. For example, each corrugator comprises one or more motors for controlling the rotation of the corrugating rollers and of the pressure roller, steam supply systems for heating the rollers and systems for supplying glue to be applied to the flutes of the corrugated paper sheet. Moreover, each section of the line or plant 1 comprises motion transmission members, such as belts, chains, shafts, joints, in addition to thrust or radial bearings. Some stations comprise rotating members that are subject to wear, such as disc-shaped knives, rectilinear or helical blades, creasing tools etc.

The functional units are subject to wear; therefore, they require, over time, to be maintained, repaired or replaced. According to one aspect described herein, in order to avoid or reduce failures that can cause long downtimes and/or in order to better schedule the replacement, maintenance and repair interventions, a method is provided for managing and controlling operational parameters of the plant 1, allowing predictive diagnostics on one or more functional units of the line or plant 1. Below, an embodiment will be generally described of a predictive diagnostics method and specific examples will be then provided (just by way of non-limiting example) of the method applied to a series of functional units of the plant 1.

One or more functional units of the plant 1 can comprise one or more sensors for detecting at least one operational parameter, or a plurality of operational parameters, of the functional unit. The sensors are used for acquiring values of the operational parameters during a learning step. After the initial learning step, the sensors are used for acquiring current values of the operational parameter(s) in order to perform a step of control and predictive diagnostics of the functional unit by using the current values and historicized data related to the values of the same parameters, previously acquired during the learning step. As better explained below, the historicized data are continuously updated, by providing that the learning step is not performed only in an initial time interval; on the contrary, it is performed continuously in a movable temporal window, here below referred to as movable learning temporal window $\Delta t_2$. In this way, the historicized values of data used for predictive diagnostics are continuously updated.

In some embodiments, the initial learning step can be avoided, and, as historicized values, values can be used of the same parameters related to a plant having similar features and which was put into operation previously. Essentially, as historicized data for a second plant (at least in an initial operation step), the values are used of the parameters related to the same functional units of a similar plant previously installed and already put into operation.

For example, the functional unit can comprise one electric motor and one or more sensors for detecting one or more electrical parameters, for example voltage, current, active or reactive power, and/or one or more parameters related to mechanical quantities such as torque, vibration, etc.

More in general, according to the kind of functional unit, one or more of the following sensors can be provided: current sensors; voltage sensors; temperature sensors; vibration sensors; speed sensors; acceleration sensors; air flow-rate sensors; steam flow-rate sensors; glue consumption sensors; pressure sensors; sensors or systems for measuring the electricity consumption; torque sensors.

The predictive diagnostics method can provide for a learning step, during which a set of historicized data is created related to an operational parameter characterizing a given functional unit. In the case of an electric motor, the operational parameter can be, for example, the absorbed current. As mentioned above, the learning step can be represented, alternatively or in combination, also by a step of acquiring historicized data from another equal or similar plant or section thereof, that has already gone into operation.

In general, some operational parameters can be acquired through suitable sensors, probes or transducers. For example, voltage and power parameters can be acquired through voltage and current sensors. Torque parameters can be detected through torque sensors or by processing electric signals of an actuating motor. Temperatures can be detected by means of temperature sensors. Forces and pressures can be detected by means of sensors or load cells, pressure switches and the like. In some cases, some operational parameters can be provided by drives of respective actuators. In some cases, operational parameters can be already available as process parameters, such as pressure, speed, etc.

FIG. 2 schematically shows a way for implementing the method disclosed herein. More specifically, FIG. 2(A) shows a generic diagram of a generic operational parameter, for example the current absorbed by a motor, as a function of time. The operational parameter is sampled with a sampling interval indicated with $\Delta t_{sample}$ in FIG. 2. On the horizontal axis the time is indicated, while on the vertical axis the operational parameter is indicated. The sampling interval can be, for example, one second.

In some embodiments, the operational parameters can be previously processed. They can be filtered, interpolated, or processed in other manner, for instance.

A movable learning temporal window, indicated with $\Delta t_2$, is identified along the time axis. The movable learning temporal window can last, for example, some days or weeks. Just by way of example, the movable learning temporal window (below also simply "learning temporal window") can last 60 days. The data acquired by means of a control system during the movable learning temporal window $\Delta t_2$ are processed, and the processing result is stored. According to some embodiments, single calculating windows, for calculating a statistical function related to the operational parameter in question, are identified within the movable learning temporal window $\Delta t_2$. In the diagram of FIG. 2, the window for calculating the statistical function is indicated with $\Delta t_1$. The calculating window is substantially a temporal window, the duration whereof is lower than that of the learning temporal window $\Delta t_2$. In some embodiments, the duration of the calculating window $\Delta t_1$ for calculating the statistical function is some minutes.

Processing of the historicized data acquired within the movable learning temporal window $\Delta t_2$ can provide for calculating a first statistical function and, if necessary, a second statistical function within each calculating window $\Delta t_1$ for calculating the statistical function. In some embodiments, the statistical function can be a power spectral density, or a root mean square, or simply a maximum value and a minimum value, calculated on the set of data related to the controlled parameter and acquired within the temporal window in question. In particularly advantageous embodiments, the statistical function can be a variance (indicated with $\sigma$ in FIG. 2) or a mean (indicated with $\mu$ in FIG. 2) of the values of the operational parameter in question. In advantageous embodiments, both the variance and the mean are calculated of the data acquired in each single window $\Delta t_1$ for calculating the statistical function. It is also possible to calculate more than two statistical functions.

Practically, along the movable learning temporal window $\Delta t_2$ a movable calculating window $\Delta t_1$ can move at regular intervals, for example 1 s, within which the statistical function(s) related to the data contained in this window are calculated. In this way, the statistical functions are calculated on all the historicized data acquired during the period of time defined by the movable learning temporal window $\Delta t_2$.

For each position of the calculating window $\Delta t_1$ it is possible to calculate the variance and the mean of the values of the operational parameter contained within the calculating window. For example, for a generic position $i^{-th}$ of the calculating window $(\Delta t_1)_i$, a variance $\sigma_i$ and a mean $\mu_i$ can be calculated in this way, where (i=1 ... N). The maximum and minimum values of the variance and the of mean, indicated as follows in FIG. 2, can be selected among all values calculated for the mean $(\mu_1, \mu_i, \ldots \mu_N)$ and among all values calculated for the variance $(\sigma_1, \sigma_i, \ldots \sigma_N)$ for a given movable learning temporal window $\Delta t_2$:
maximum value of the mean: MAX($\mu$),
minimum value of the mean: min($\mu$)
maximum value of the variance: MAX($\sigma$)
minimum value of the variance: min($\sigma$).

The maximum and minimum values of the two statistical functions are stored by the control unit of the plant 1. As the movable learning temporal window $\Delta t_2$ is a window movable over time, as described below, the four maximum and minimum values of variance and mean vary over time, while the plant is operating.

In some embodiments, it is possible to detect the values MAX($\mu$), min($\mu$), MAX($\sigma$) and min($\sigma$) by using a higher number of samples of the operational parameter. To this end, it is possible to do the following.

A suitable sampling interval $\Delta t_{sample}$ is chosen. The sampling interval can last some seconds, for instance. Just by way of non-limiting example, it is possible to set a sampling interval $\Delta t_{sample}$=1 second. At every second it is possible to calculate the value of the two statistical function, variance and mean, on the operational parameter values acquired during the just elapsed calculating window $\Delta t_1$. At the subsequent second, the calculating window $\Delta t_1$ moves by 1 second and the variance and the mean are calculated again on the values of the operational parameter in the calculating window $\Delta t_1$ translated by 1 second. The process can continue for the whole day, for instance. For each day it is possible to detect and store the maximum and minimum values of variance and mean calculated as described above. The maximum and minimum values can be also calculated, instead of over 24-hours, over a different time frame, for example every hour, or every ten hours. The 24-hours frame is chosen just by way of practicality. Practically, in case of a sampling interval of 1 second, over a day 24×60×60=86400 values of variance and the same number of values of mean are collected. Each value is calculated on a calculating window $\Delta t_1$. Based on the 86400 values collected every day for each of the two statistical functions, the maximum value and the minimum value $\sigma_{MAX}$, $\sigma_{min}$, $\mu_{MAX}$, $\mu_{min}$ are identified. At the end of the learning step, i.e. once the temporal window $\Delta t_2$ has elapsed, whose generic duration is G days, the system will have G maximum values of variance, G maximum values of mean, G minimum values of variance and G minimum values of mean. If $\Delta t_2$=60 days, 60 maximum and minimum values will be available for each statistical function. Based on each of these four sets of G=60 elements, the values MAX($\mu$), min($\mu$), MAX($\sigma$) e min($\sigma$) are identified.

In other embodiments, it is possible directly to identify the maximum and the minimal among all the collected samples.

Once the initial learning step is finished, or once the values related to a similar plant already in operation have been acquired, the values of the operational parameter continue to be acquired in a time interval $\Delta t_3$, whose duration is preferably lower than the width, i.e. the duration, of the movable learning temporal window $\Delta t_2$. For example, the time interval $\Delta t_3$ can have a duration of some days, for example from 0 to 20 days, typically 15 days. It should be understood that these numerical data, as well as the previous ones, are given just by way of non-limiting example.

Once the time interval $\Delta t_3$ following the movable learning temporal window $\Delta t_2$ (or whose data are added to the data acquired by a data collection done for a similar plant) has elapsed, the predictive diagnostics process starts for the functional unit, to which the detected and processed operational parameter refers. This step provides for calculating the first statistical function and the second statistical function (variance and mean in the illustrated example) of the values of the operational parameter detected during a current temporal window $\Delta t_{act}$. In some embodiments, the duration of the current temporal window can be the same as the duration of the window $\Delta t_1$ for calculating the statistical function. As it will be better explained below, this is particularly preferred as the data acquired during this step in the current temporal window $\Delta t_{act}$ will be used as historicized data for dynamic learning. Also the current temporal window $\Delta t_{act}$ is movable, i.e. it translates over time similarly to the movable learning temporal window $\Delta t_2$. The current temporal window preferably remains at a fixed temporal distance (interval $\Delta t_3$) from the movable learning temporal window.

In the diagram of FIG. 2, the values of the statistical function variance and of the statistical function mean for the operational parameter, calculated in the current temporal window $\Delta t_{act}$, are indicated with $\sigma_{act}$ and $\mu_{act}$, respectively.

The values $\sigma_{act}$ and $\mu_{act}$ calculated in the current temporal window $\Delta t_{act}$ are compared with the values MAX($\mu$), min($\mu$); MAX($\sigma$); min($\sigma$) defined above and calculated in the movable learning temporal window $\Delta t_2$. If the functional unit, to which the operational parameter in question refers, operates correctly, the statistical values $\sigma_{act}$ and $\mu_{act}$ shall be comprised between the maximum and minimum values calculated in the movable learning temporal window. If necessary, it is possible to provide, for each of the two statistical functions, respective tolerance intervals above and below the respective maximum and minimum values. Starting from the values MAX($\mu$), min($\mu$); MAX($\sigma$); min($\sigma$), the extended intervals comprising a tolerance margin are defined as follows:
interval of the first statistical function (variance): [min($\sigma$)−$\Delta$; MAX($\sigma$)+$\Delta$]
interval of the second statistical function (mean): [min($\mu$)−$\Delta$; MAX($\mu$)+$\Delta$]

In particularly advantageous embodiments, in each interval defined above it is possible to define a respective intermediate interval:

$$[\min(\sigma)-\Delta';\text{MAX}(\sigma)+\Delta']$$

$$[\min(\mu)-\Delta';\text{MAX}(\mu)+\Delta']$$

where $\Delta'<\Delta$.

In FIG. 2(B) a Cartesian diagram is shown; on the horizontal axis the mean is indicated, on the vertical axis the variance is indicated.

In the diagram the following is shown: a first inner square, defined by the maximum and minimum values of variance and mean; an intermediate square, containing the inner square, and an outer square, containing the inner square and the intermediate square, defined by the above indicated intervals.

In the illustrated example, the values A and A' have been taken, equal for the intervals of variance and mean, respectively. However, this is not strictly necessary. It should be understood that, for example, different margins can be provided to enlarge the intervals of mean and variance.

Moreover, as noted, whilst in the described example two statistical functions (variance and mean) are used, it should be understood that in other embodiments different statistical functions can be used, and/or a different number of statistical functions.

The current values $\sigma_{act}$ and $\mu_{act}$ of variance and mean calculated in each current temporal window $\Delta t_{act}$ substantially define the coordinates of a point in the diagram of FIG. 2(B). The functional unit, to which the operational parameter refers, on which the current values $\sigma_{act}$ and $\mu_{act}$ of variance and mean are calculated, operates correctly if this point is within the square defined by MAX($\mu$), min($\mu$), MAX($\sigma$) and min($\sigma$). If the point is within the square defined by:

$$[\min(\sigma)-\Delta';\text{MAX}(\sigma)+\Delta']$$

$$[\min(\mu)-\Delta';\text{MAX}(\sigma)+\Delta]$$

it can be provided that no alarm or pre-alarm signal will be emitted, as $\Delta'$ can be considered as a tolerance value around a punctual datum. If the point is between the intermediate square and the outer square defined by $$[\min(\mu)-\Delta;\text{MAX}(\mu)+\Delta]$$

$$[\min(\sigma)-\Delta;\text{MAX}(\sigma)+\Delta]$$

a pre-alarm signal is emitted, and if the point is outside the largest square an alarm signal is emitted. These anomalous situations of deviation of the statistical functions from the square calculated during the learning step (or acquired from historicized data stored during the operation of an analogous plant or an analogous functional unit of another plant) are indicative of an incipient failure and therefore the respective alarm represents a useful piece of information of predictive diagnostics.

Anomalous data are useful to highlight the approaching of a failure condition, but they shall not be used in the data acquiring step, i.e. in the system learning step, as this could cause errors. Therefore, it is possible to provide for automatic removal (for example through an algorithm) or manual removal (for example by an operator) of anomalous data from the series of data useful for the learning step.

In some embodiments, only one alarm threshold can be used, instead of two alarm thresholds (or pre-alarm and alarm) as described above.

In some embodiments a time threshold can be provided to avoid false alarms, for example due to temporary fluctuations of the operational parameter resulting from factors that are not linked to an incipient failure condition. The alarm or pre-alarm is only generated if the point defined in the diagram of FIG. 2(B) by the values $\sigma_{act}$ and $\mu_{act}$ remains outside the square defined between the values MAX($\mu$), min($\mu$), MAX($\sigma$) and min($\sigma$) and the tolerance intervals, if any, for a time longer than a pre-set time threshold. On the contrary, i.e. in case the anomaly ends after a time shorter than the pre-set temporal threshold, no alarm is generated.

The operational anomalies that can cause such alterations in the used statistical functions (for example the values of variance and mean) to trigger a pre-alarm or an alarm signal, can be due to different outer causes, among which a wrong adjustment or a wrong use of the functional unit, an incipient fault or a degradation due to wear, or any other cause.

The square represented in FIG. 2(B) can be used on a monitor to give an immediate visual indication that can be promptly understood by the operator. To give an even more intuitive representation, it is possible to change the coordinates to represent the same situation of FIG. 2(B) in a circular diagram as indicated in FIG. 2(C).

The method for controlling the functional unit, to which the detected operational parameter refers, can provide for calculating the current values $\sigma_{act}$ and $\mu_{act}$ in the current temporal window $\Delta t_{act}$ with a sampling interval $\Delta t_{sample}$ of 1 second, for example. Every second the current temporal window is moved and the coordinates $\sigma_{act}$ and $\mu_{act}$ of the actual operation point in the plane $\sigma$, $\mu$ (FIG. 2(B) or FIG. 2(C)) is calculated again.

As indicated above, the current values $\sigma_{act}$ and $\mu_{act}$ of the statistical functions $\sigma$ and $\mu$ calculated in the current temporal window $\Delta t_{act}$ are compared with the maximum and minimum values of the same statistical functions, identified in the movable learning temporal window $\Delta t_2$, which is temporality separated by an interval $\Delta t_3$ from the current temporal window $\Delta t_{act}$. In this way, it is possible to create discontinuity between the learning period and the current period. This can be useful to take into account the fact that some operational parameters of given functional units can be subject to a slow drift over time, for example due to aging of one or more components. Such a drift cannot be detected if the values $\sigma_{act}$ and $\mu_{act}$ are compared with the maximum and minimum values of the statistical functions that are calculated on a learning temporal window $\Delta t_2$ temporally contiguous to the current temporal window $\Delta t_{act}$. Vice versa, by introducing the time interval $\Delta t_3$, the gradual drift of the detected operational parameter results in a signal or an alarm, as one or the other or both the current values $\sigma_{act}$ and $\mu_{act}$ will be out of the square identified by the maximum and minimum values of the statistical functions calculated on the movable learning temporal window, due to the drift occurred during the time interval $\Delta t_3$.

As mentioned above, the learning step is continuous and dynamic; this means that, once the first learning step in the learning temporal window $\Delta t_2$ has finished, the data related to the controlled operational parameter continue to be stored and the learning temporal window $\Delta t_2$ will move along the time axis (horizontal axis in FIG. 2(A)), so as constantly to be at the same temporal distance $\Delta t_3$ with respect to the current temporal window $\Delta t_{act}$.

The comparison between FIGS. 2(A) and 2(D) makes this aspect clearly apparent. At every temporal step corresponding, for example, to the time width of the calculating window $\Delta t_1$, the movable learning temporal window $\Delta t_2$ translates by a step equal to the width of the calculating window $\Delta t_1$, pursuing the current temporal window $\Delta t_{act}$. The values of the statistical functions calculated on the oldest calculating window $\Delta t_1$ are discharged and rejected, while the values of the statistical functions calculated on the data contained within the subsequent calculating window $\Delta t_1$ enter the movable learning temporal window $\Delta t_2$. Essentially, as it is clearly apparent by comparing FIGS. 2(A) and 2(D), the movable learning temporal window $\Delta t_2$ is movable over time and moves forward remaining at a temporal distance $\Delta t_3$ from the current temporal window $\Delta t_{act}$. At every temporal advancing step, the older statistical data are discarded and more recent statistical data are acquired.

Every time the movable learning temporal window $\Delta t_2$ moves forward by a step $\Delta t_1$ the set of the values $(\mu_1, \ldots \mu_i, \ldots \mu_N)$ and $(\sigma_1, \ldots \sigma_i, \ldots \sigma_N)$, on which the values $MAX(\mu)$, $MAX(\sigma)$, $min(\sigma)$ are detected, changes and therefore the maximum and minimal values of the calculated statistical functions can change. The squares represented in FIGS. 2(B) and 2(C) can gradually move over the time. The learning is therefore dynamic and continuous.

The movable learning temporal window $\Delta t_2$ always remains temporally spaced by a time interval $\Delta t_3$ with respect to the current temporal window $\Delta t_{act}$. Therefore, as time passes, even if there is an update of the maximum and minimum values of the statistical functions and therefore a possible movement of the square within which (FIGS. 2(B) and 2(C)) the point defined by the values $\sigma_{act}$, $\mu_{act}$ shall be contained, there is always the possibility to detect any slow drift of the operational parameter. The duration of the time interval $\Delta t_3$ can be constant. This simplifies the processing process. However, this is not strictly necessary.

Even if reference has been made above to a situation where two statistical functions (mean and variance) are used to define a two-dimensional diagram, where a square or a circular area is defined, within which the point defined by the values $\sigma_{act}$, $\mu_{act}$ shall be positioned, it is also possible to use only one statistical function, for example only variance or only mean. In this case, all the considerations made above apply, with the only difference that the statistical function will be only one and the diagram will be one-dimensional rather than two-dimensional.

In other embodiments, it is also possible to use more than two statistical functions, with the same criterion described above. In this case, from a graphical viewpoint, the point of current operation of the functional unit, or more precisely the value of the operational parameter related to this functional unit, shall remain within a cubic (or spherical) volume defined by the maximum and minimum values of the three statistical functions calculated within the movable learning temporal window Even if in the present description specific reference is made to variance and to a generic mean of the values of the operational parameter in question, it should be however understood that other statistical functions can also be used.

Moreover, the mean can be an arithmetic mean, a weighted mean, a geometrical mean, a harmonic mean, a power mean, an arithmetic-geometrical mean, an integral mean, a temporal mean, or any other function defining a mean of values.

In the above description of the method for controlling a generic operational parameter of a generic functional unit of the plant 1, reference has been made only to the operational parameter and to the time. In this case, predictive diagnostics provides for comparing the trend over time of the operational parameter in question (for example, the current absorbed by a motor) and the trend of the same parameter in the movable learning temporal window $\Delta t_2$, independently of other operational parameters.

However, in some cases a generic operational parameter can be correlated to a second operational parameter, or to more operational parameters, that shall be taken into account for checking the trend thereof over time.

For example, the current absorbed by a motor controlling the feeding of the composite corrugated board along the double facer 8 of section 9 can be constant given the same operational parameters of the line and in particular given the same pressure with which the composite corrugated board is pressed against the double facer 8. It is possible to detect an incipient failure or a degradation in the motor performances due to ageing based on a change in the statistical function, for example variance and/or mean, calculated on the current absorbed by the motor.

However, if the pressure with which the composite corrugated board is pressed against the double facer 8 changes, also the current absorbed by the motor varies correspondingly. This variation in the absorbed current is not due to an incipient fault of the motor, but to the change of a parameter (pressure) correlated to the absorbed current.

In this case, the correlation between absorbed current and pressure of the composite corrugated board on the double facer 8 shall be taken into account; the pressure represents the second operational parameter, correlated to the first operational parameter, represented by the absorbed current. If this second operational parameter is not taken into account, and if the values of mean and variance calculated with a given pressure of the board against the double facer 8 are compared with the minimum and maximum values of these statistical functions calculated in a movable learning temporal window, in which the pressure of the board had a different value, a very wide sub-set of data will be obtain related to a plurality of different working conditions. An anomalous situation or a fault could be signaled, not corresponding to the reality and due to the fact that the compared values relate to different situations, where the absorbed current is subject to the effect of the change in pressure with which the corrugated board is pressed against the double facer 8. Even more likely is the case of no detection of faults due to a "not strict" learning.

Generally speaking, in some embodiments, the method described above provides that, during learning, if the operational parameter is correlated with one or more second parameters, for each value or range of values of said one or more second correlated parameters, in each calculating window the statistical functions are calculated in correlation with the value of the one or more second parameters.

For example, in the case of the current absorbed by the motor feeding the composite corrugated board through the section 9 of the double facer 8, the following can occur. During the learning step the calculated values of the statistical functions are correlated with the value of the parameter pressure. All calculated values of the statistical functions in the movable learning temporal window $\Delta t_2$ are classified in groups, each of which contains the calculated values of the statistical function for a given pressure (or range of pressure) exerted by the composite corrugated board against the double facer 8.

In the step of comparing the historicized values and the current values of the statistical functions calculated in the current temporal window $\Delta t_{act}$ for a given pressure, the current values are compared with the maximum and minimum values of the statistical functions detected in the group of the calculated values of said statistical values on the values of the operational parameter detected given the same pressure.

In other words, in a given current temporal window $\Delta t_{act}$ the pressure of the composite corrugated board on the double facer 8 can take a given current value. The values of the statistical functions of variance and mean calculated in said current temporal window $\Delta t_{act}$ are compared with the maximum and minimum values of the same functions calculated on historicized data in the movable learning temporal window $\Delta t_2$ corresponding to the same pressure value or to a range of pressure values, within which the current pressure is contained.

To this end, it is sufficient that, during the learning step, the collected data are grouped according to the value of the second current parameter(s). As the movable learning temporal window $\Delta t_2$ has a relatively long duration (for example some weeks, or months), in this time interval the plant 1 will operate in various operating conditions, for example with different pressures of the composite corrugated board on the double facer 8. The calculation of the statistical functions and the selection of the maximum and minimum values are done for homogeneous values of pressure. If the plant 1 operates at three different values of pressure P1, P2, P3 of the composite corrugated board on the double facer 8 in different time intervals within the movable learning temporal window $\Delta t_2$, for each calculating window $\Delta t_1$ the pressure value is determined and the related values of the statistical functions will be attributed to one or the other of three distinct groups of values, one for each pressure value P1, P2, P3. The maximum and minimum values, MAX($\mu$), min($\mu$), MAX($\sigma$) and min($\sigma$) of the statistical functions (in the example, variance and mean), will be individually calculated to each of the three groups, so that at every instant, based on the historicized data collected in the movable learning temporal window, three values MAX($\mu$), min($\mu$), MAX($\sigma$) and min($\sigma$) will be available for the three pressure values P1, P2 and P3. The predictive diagnostics control will be then performed as follows. The actual values $\sigma_{act}$ and $\mu_{act}$ of the two statistical functions calculated at every sampling interval in the current temporal window $\Delta t_{act}$ will be compared with the values MAX($\mu$), min($\mu$), MAX($\sigma$) and min($\sigma$) corresponding to the same pressure value P1, P2 or P3.

The following two practical examples, referred to two particular functional units, better explain this.

Each shearer 62A, 62B in the transverse cutting station 62 comprises a motor for rotating a blade-holding roller and an anvil blade. In the diagram of FIG. 3, showing anyone shearer of the transverse cutting station 62, a blade-holding roller 64A is shown, with a blade 66 co-acting with a roller 64B carrying an anvil blade 68. The reference number 70 generically indicates a motor for rotating the rollers 64A, 64B.

The motor 70 is a functional unit of the plant 1, in the meaning defined above. It is continuously controlled by the predictive diagnostic system described herein. The motor 70 can be connected to a power supply grid, schematically indicated with G. A sensor or group of sensors 72 can detect electrical quantities of the motor 70, for example the voltage and the absorbed power. In some embodiments, two independent motors can be provided for the two rollers 64A, 64B. What described below applies either to a single motor or to each motor. Alternatively, instead of using sensors for detecting electric parameters, the electric parameters can be made available by the drive of the respective motor.

As known, each shearer 62A, 62B shall be so controlled that the peripheral speed of the cutting members 66, 68 is equal to the speed $V_N$ at which the corrugated board N is fed in the nip between the two rollers 64A, 64B. If the circumferential extension of the rollers is equal to the cut length, i.e. to the distance between two consecutive transverse cuts, the peripheral speed of the rollers can be kept constant and equal to $V_N$, and therefore the angular speed of the rollers 64A, 64B is kept constant. However, if the cut length is different than the circumferential extension of the rollers 64A, 64B, the two rollers shall be cyclically accelerated and slowed down so as to make a complete rotation between a cut and the following one, and such that, at the same time, they have a constant speed equal to the feeding speed $V_N$ during cutting, i.e. when blade 66 and anvil blade 68 are into contact with the corrugated board N. This time interval corresponds to a given potion, in radians, of the rotation angle, that can depend on the shape of the blade and the anvil blade, that usually have a helical shape. Cyclical accelerations and decelerations, at every cut, entail a cyclical change in the current absorption by the motor 70.

The current absorbed by the motor 70 therefore depends on the following factors:
  feeding speed $V_N$ of the corrugated board
  cut length L, i.e. length of the single sheets of corrugated board.

The diagrams of FIGS. 4A, 4B, 4C and 4D show, just by way of example, the trend of the peripheral speed of the rollers 64A, 64B as a function of time, for four different cut lengths. L indicates the cut length, i.e. the distance between two subsequent cuts made by the shearers on the continuous corrugated board sheet. Lc indicates the length of the circumference of the rollers 64; 64B, or more exactly the length of the circumferences on which the blade 66 and the anvil blade 68 move.

FIG. 4A shows the case where the cutting length L is equal to the length Lc of the circumference. The peripheral speed $V_P$ of the rollers 64A, 64B is constant and equal to the speed $V_N$ of the corrugated board. The power absorbed by the motor 70 (or by each motor actuating the rollers 64A, 64B of the shearers 62A, 62B) is substantially constant if there are no disturbance factors.

FIG. 4B shows the situation where the cut length L is greater than the length Lc. In this case, the rollers 64A, 64B shall slow down between a cut and the following one, to allow the passage of a quantity of corrugated board N greater than the length Lc of the circumference, whilst during cutting (intervals indicated with $t_{cut}$ in FIG. 4B) the peripheral speed of the rollers or, more exactly, of the blade 66 and of the anvil blade 68 is equal to the speed $V_N$. Each roller 64A, 64B and the respective motors 70 perform acceleration and deceleration ramps, as shown in the diagram of FIG. 4B. In the example of FIG. 4B the rotation speed of the rollers 64A, 64B is zero for some time intervals (t0).

If the speed $V_N$ of feeding the corrugated board N is very high, the rollers 64A, 64B shall achieve, in the intervals $t_{cut}$, very high values of peripheral speed. In this case it is convenient that the acceleration and deceleration ramps are such as to never completely stop the rollers 64A, 64B, as shown in FIG. 4C.

In both cases shown in FIGS. 4B and 4C, between two subsequent cuts the rollers 64A, 64B have an average speed lower than the speed $V_N$.

If the cut length L is less than the length Lc, it is necessary for the rollers 64A, 64B to accelerate between a cut and the following one, i.e. they shall rotate with a peripheral speed higher than the speed $V_N$ of the corrugated board, in the time interval during which the blade 66 and the anvil blade 68 are not engaged in the corrugated board N (time $t_{cut}$). This situation is illustrated in FIG. 4D.

The current absorbed by the motor 70 can vary, for example with a slow drift over time, due to wear or to an incipient fault. The predictive diagnostics method described herein is adapted to detect this drift by comparing the values of one or more statistical functions, as described above, with the historicized data during the previous learning step. Since the absorbed current is correlated with the cut length, as mentioned above, it is necessary that the comparison between the values of the statistical functions calculated in the current temporal window and the maximum and minimum values deriving from the data acquired during the learning step takes this correlation into account.

To this end, it is for example sufficient that the data on current and voltage absorption acquired during the movable learning temporal window $\Delta t_2$ are correlated with the cut length set every time. Therefore, during the movable learning temporal window $\Delta t_2$ current absorption data will be collected, grouped according to the cut length. For each set cut length the maximum and minimum values of the statistical functions will be calculated in the movable learning temporal window, thus obtaining maximum and minimum values of the statistical functions for each length, or for sufficiently narrow ranges of cut length.

During the current window $\Delta t_{act}$ the value of the statistical function(s) will be calculated and these values will be compared with the maximum and minimum values of the same statistical functions calculated as described above based on the data acquired in the movable learning temporal window, with reference to the corresponding cut length.

FIGS. 5A, 5B, 5C, 5D, 5E and 5F show six diagrams showing the data, acquired during a movable learning temporal window, related to the current absorbed by one of the motors of a shearers 62A, 62B for different conditions of feeding speed $V_N$ of the corrugated board and for different cut lengths L. The current values in Ampere (A) are shown on the ordinate axis and the speed values (m/min) are shown on the abscissae axis. In each diagram, the cut length is indicated in mm. For example, the diagram of FIG. 5A relates to a cut length L equal to 621 mm. In advantageous embodiments, the current value is not an instant value, but a mediated value, for example the quadratic mean calculated on a short time interval, or a value filtered with a low-pass filter. This allows avoiding errors due to punctual detection of instant peak values. The principle of using an average value instead of the instant value can be used in relation not only to the absorbed current, but also for other parameters used for predictive diagnostics of a generic functional unit.

By comparing FIGS. 5A-5F it is apparent that the cut length (and therefore the profile of the peripheral speed of the cutting rollers) is correlated with the trend of the current given the same line speed ($V_N$). It is therefore clearly apparent that, by performing the predictive diagnostics method described above, in order to have useful information, it is necessary that the values of the statistical functions related to the absorbed current in the current temporal window are compared with the maximum and minimum values of the statistical functions calculated on the learning temporal window given the same cut length (L) and the same line speed ($V_N$). Therefore, at every instant, the control system shall know: the line speed ($V_N$) and the set cut length (L). Based on this, for each movable learning temporal window the values MAX($\mu$), min($\mu$), MAX($\sigma$) and min($\sigma$) will be determined, calculated for the same value of L and for the same value of $V_N$, or for sufficiently narrow ranges of values of L and $V_N$ within which the current values of L and $V_N$ fall. By indicating the maximum and minimum values of the statistical functions for the values of L and $V_N$ with: MAX[$\mu$(L,$V_N$)], min[$\mu$(L,$V_N$)], MAX[$\sigma$(L,$V_N$)] and min[$\sigma$(L,$V_N$)], around them a tolerance interval is defined, as explained with reference to FIG. 2(B) or 2(C). In the current temporal window the values of the statistical functions $\sigma$(L,$V_N$) and $\mu$(L, $V_N$) are calculated and it will be checked whether these values fall within the tolerance interval defined around the values MAX[$\mu$(L,$V_N$)], min[$\mu$(L,$V_N$)], MAX[$\sigma$(L,$V_N$)] and min[$\sigma$(L,$V_N$)]. If no, an alarm signal will be emitted indicating that the detected current is subject to fluctuations that are not statistically compatible with a right operation and are therefore indicative of an imminent fault.

The process described above for controlling a first operational parameter of a functional unit (for example current absorbed by the motor) correlated with a further parameter of the same functional unit (for example, feeding speed $V_N$ and/or cut length L) can be applied to a plurality of functional units and corresponding parameters.

For example, in the section 9 of the double facer 8 a feeding system is provided for the corrugated board N on the double facer and a pressure system, with which the corrugated board is pressed against the double facer 8 with variable pressure.

FIG. 6 shows a diagram of section 9 in a possible embodiment. Further details of an embodiment of the double facer 8 of section 9 are disclosed, for instance, in U.S. Pat. No. 7,291,243. The section 9 illustrated herein is just an example, and those skill in the art know that the section 9, usually referred to as "double-facer", can be configured in various manner and can have pressure systems and corrugated board feeding systems different than those illustrated herein.

In the schematic example of FIG. 6 the corrugated board N is fed by means of a felt or other continuous element 72, driven around guiding rollers, at least one of which is motorized. For example, the more downstream roller 73 can be motorized with a motor 74. The reference number 76 indicates a pressure system pressing the lower branch of the continuous element 72 against the corrugated board N, which is drawn by friction by the continuous element 72 and moves forward sliding on the double facer 8.

The current absorbed by the motor 74 depends, to certain extent, on the corrugated board feeding speed $V_N$ and, to a greater extent, on the pressure exerted by the pressure system 76, on which depends the friction force between corrugated board and double facer 8 and, therefore, the current absorbed by the motor 74.

Figure 7:
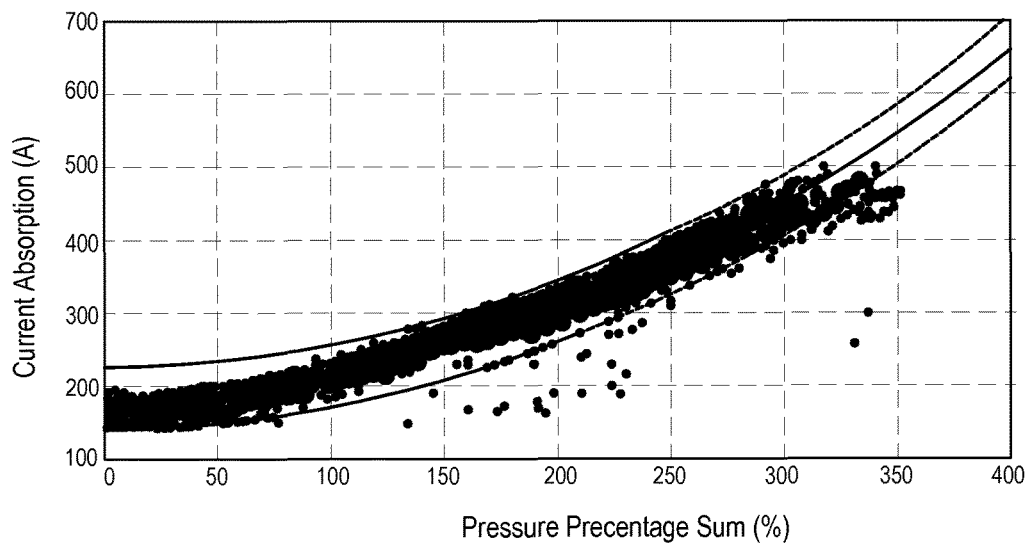
FIG. 7 shows a diagram of the diagnostics method applied to the double facer of FIG. 6.

FIG. 7 shows a diagram where on the abscissae axis the percentage pressure value is indicated with respect to a nominal value, and on the ordinates axis the current absorbed by the motor 74 is indicated. The collected points represent the values detected during the learning step. Within the two dashed curves 99% of the collected data fall.

In order to control the right operation of the functional unit represented by the motor 74, the absorbed current can be used as operational parameter. The value of the statistical function related to the absorbed current detected in a current temporal window is compared with the maximum and minimum values of the statistical function calculated on the movable learning temporal window. However, as the absorbed current depends on the pressure at which the corrugated board is pressed against the double facer, the statistical function, or each statistical function taken into account, is calculated for corresponding or comparable pressure values. Practically, if the operating pressure is equal to 150% of the nominal pressure, the values of the functions $\mu$, $\sigma$ calculated based on the values of current acquired in the current temporal window $\Delta t_{act}$ are compared with the values MAX($\mu$), min($\mu$); MAX($\sigma$); min($\sigma$) calculated in the movable learning temporal window $\Delta t_2$ based on data on the current absorption in correspondence of equivalent operating conditions, i.e. with the same pressure on the corrugated board, equal to 150% of the nominal pressure.

Moreover, the speeding feed $V_N$ of the corrugated board N can be used as further operational parameter.

The criteria described above can be applied to any functional unit of the plant 1. One or more operational parameters can be collected for each functional unit. It is possible to take into account the trend over time, or the trend over time and as a function of one or more further operational parameters correlated therewith.

Figure 8:
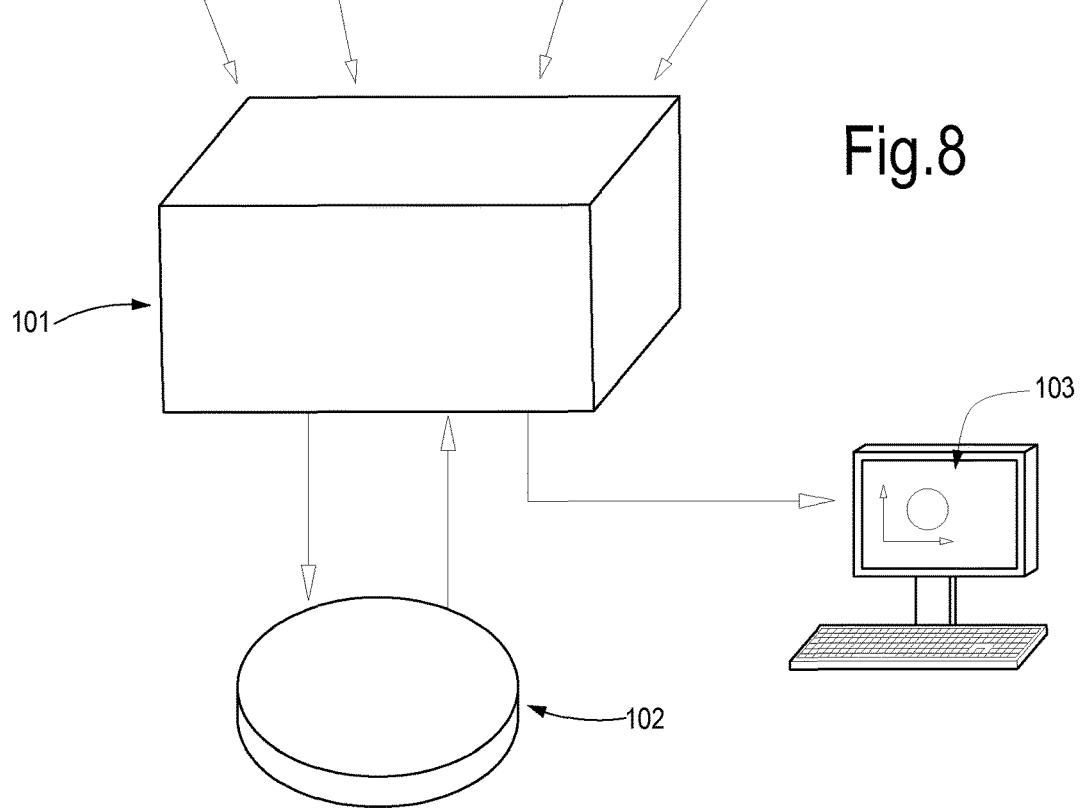
FIG. 8 shows a diagram of the data management system associated with the corrugated board production line.

FIG. 8 shows a functional block diagram of a generic corrugated board production plant 1. GF1, GF2, . . . GFj, . . . GFn indicate n generic functional units. Pik indicates the operational parameters of each functional unit GFi. For the sake of simplicity, it has been assumed that for each functional unit GFi m functional parameters (from Pi1 to Pim) have been provided. This is however not strictly necessary. In general, the value of m is variable for each functional unit, i.e. each functional unit can have a variable number of operational parameters.

The operational parameters are detected through suitable sensors interfacing a central control unit 101, adapted to manage the collected data, to process and store them in a memory bank 102 of suitable storage capacity. In the database the following can be stored: the maximum and minimum values of the statistical functions calculated in the learning temporal windows; the values of these statistical functions calculated in the current temporal window; both for more values or ranges of values of one or more correlated parameters, if required.

The central control unit 101 can continuously or intermittently compare the values of the statistical functions of each operational parameter calculated in the current temporal window with the maximum and minimum values calculated in the movable learning temporal window and give information, signals or alarms through a user interface 103, for example a monitor or other apparatus.

The method described above in general terms, and specifically with reference to the motor of the shearer 62A, 62B and the motor 74 for feeding the corrugated board N through the section 9 of the double facer 8, can be applied for performing predictive diagnostics of one or more functional units of one or more stations, sections, parts or components of the plant 1. Here below a series of example cases are listed, just by way of non-limiting example, of functional units and corresponding parameters, to which the predictive diagnostics method described herein can be applied. The functional units are in general grouped, if necessary, according to the section of the plant where they are arranged.

Each unwinder 31, 47 may comprise a motor for controlling the lifting and lowering movement of the reels B1, B2, as well as one or more motors for actuating a splicer. Each motor can be a functional unit controlled by the programmable control unit 101. The operational parameter can be the current absorbed by the motor. The current absorbed by the motor controlling the lowering and lifting of the reels can be correlated with the dimension or the weight of the reel.

In addition to a control and diagnostics of the unwinder motor, other operational parameters can be provided, which allow to diagnostic or predict other type of faults or malfunctions, if suitably controlled. For example, through one or more vibration sensors it is possible to detect any alteration in the vibrations generated during operation. These alterations can be indicative of incipient faults of moving members, such as support bearings, or motion transmission systems, such as belts, chains and toothed wheels.

Sensors can be also provided for detecting the tension of the paper sheet. Fluctuations in the paper tension can be indicative of an incipient fault or of a malfunction of the components destined to manage the paper tension. Typically, unwinding occurs through traction, while the paper reel is braked, so that the paper sheet is unwound with a given and suitably calibrated tension. A fluctuation of the tension can be for example indicative of a malfunction of the brakes.

In some embodiments, sensors for measuring the consumption of pressurized air, or pressure sensors for detecting the pressurized air pressure can be provided. Fluctuations or changes in these parameters can be correlated with an excessive consumption of air, indicative of leakages in the ducts and/or of malfunctions of the members fed with pressurized air, for example the brakes of the unwinders.

Different functional units can be provided in each corrugator 21, subject to predictive diagnostics control. First of all, actuators, which variously actuate continuous or intermittent movements of the corrugator members, can be subject to predictive diagnostics. These actuators can be electric (electric motors) or hydraulic or pneumatic actuators. For example, the following can be controlled: the rotation motor of one or both the corrugating rollers 23, 25, the motor actuating the glue dispensing unit 36, one or more motors controlling the rotation of one or more guiding rollers 37, 39, 33 guiding the paper sheets N1, N2, the actuators controlling the wrapping angle of the single paper sheets around the heating and guiding rollers. The operational parameters of these actuators can be the current absorbed by the motor. The current can be correlated with one or more additional parameters, such as the feeding speed $V_N$ of the paper and corrugated board sheets through the plant, the paper tension, the pressure between the corrugating rollers 23, 25, the pressure between the corrugating roller and the pressure roller 27, the dimension of the gap between corrugating roller 25 and roller 36 of the gluing unit, parameters of the roller heating steam that can affect the roller thermal deformation.

The gluing unit, comprising the roller 36, can constitute a further functional unit in the meaning intended herein. The operational parameter can be the glue flow rate, i.e. the quantity of glue consumed per time unit. According to a possible embodiment, the parameter represented by the glue flow rate is controlled as auto-correlation, i.e. the values of the statistical quantities of this parameter are compared with the maximum and minimum values calculated in the movable learning temporal window, assuming that the glue consumption does not depend on other correlated operational parameters. A drift in the consumed glue quantity can be indicative of an imminent fault of the glue applying unit, or indicative of a wrong adjustment thereof.

However, the operational parameter of the glue consumption can be correlated with one or more further parameters. For example, the consumed glue quantity can be correlated with the paper type (recycled, new, paper thickness, etc.), the flute shape, the operating temperature, i.e. the temperature of paper in the area where the glue is applied, the pressure at which the pressure roller 27 presses the corrugating roller 25, the glue viscosity, the temperature, the feeding speed $V_N$.

As known, the corrugator 21 can comprise one or more internally heated rollers. For example, one or both the corrugating rollers 23, 25, the pressure roller 27, one or more guiding roller, for instance the rollers 33, 37, 39, can be internally heated. The rollers can be heated electrically, or by means of a heat-transferring fluid, such as steam, water, oil or other fluid. It is also possible to use more thermal power sources in combination or alternatively. One, some or all the heated rollers, and the corresponding heating systems, can be intended as functional units. In this case, as operational parameters it is possible to use a quantity indicative of the thermal power consumption, i.e. of the absorbed thermal power. This can be detected by measuring the absorbed current, in case of heating through electricity, or by measuring the flow rate of the heat-transferring fluid and the temperature drop between input and output of the heated member, for example between the entrance and the exit of a heated roller. The necessary thermal power, i.e. the heat quantity in the time unit used for heating the respective heated member up to the desired temperature can depend on different factors or correlated operational parameters, such as in particular the paper feeding speed $V_N$, the quantity of supplied glue, the paper parameters.

As already indicated with reference to the unwinder, also for the corrugator other operational parameters can be controlled, for example the vibrations and the parameters related to the pressurized air. Vibrations can be detected and monitored to highlight anomalies correlated with incipient faults of the bearings of the rotating members, of the motion transmission members (chains, belts, gears), and in general all the moving members. Parameters correlated with the pressurized air, such as pressure and flow rate, can be detected to check leakages in the plant.

Heating rollers can be provided along the path of the smooth and corrugated paper sheets, downstream of the corrugators 21 and upstream of the station 9 with the double facer. For example, three heating rollers 43, 45 and 49 are provided in the illustrated embodiment. Each of them can be associated with an actuator which changes the wrapping angle, i.e. the angle of contact of the paper sheet around the roller. Each of said rollers can be motorized by means of an actuator, for example an electric motor. Each actuator can constitute a functional unit in the meaning intended herein. Analogously, each heating system can constitute a functional unit in the meaning intended herein. As operational parameters can be used values of power absorbed for actuation, or values of other parameters that are function of the absorbed power, for example the value of the electrical current absorbed by the electric motor, of which the auto-correlation is detected, i.e. the change over time of the statistical function(s), or which can be controlled also in correlation with other operational parameters.

For example, in the case of the heated rollers 43, 45, 49 the thermal power absorbed for heating can be an operational parameter correlated with the arc of contact with the paper sheet, the feeding speed ($V_N$), parameters of the cellulose material used, paper thickness, shape of the flutes of the corrugated paper, etc.

Each gluing unit 51, 53 can constitute a functional unit as intended herein. Each gluing unit 51, 53 can be controlled based on the operational parameter constituted by the glue consumption. This parameter can be checked in correlation with other parameters, as already indicated with reference to the gluing unit of the corrugators, for example based on features of the paper sheets, the feeding speed $V_N$, etc.

As already indicated with reference to the unwinder and the corrugator, also for the gluing unit other operational parameters can be controlled, for example the vibrations and the parameters related to the pressurized air. Vibrations can be detected and monitored to highlight anomalies correlated with incipient faults of the bearings of the rotating members, of the motion transmission members (chains, belts, gears), and in general of all the moving members. Parameters correlated with the pressurized air, such as pressure and flow rate, can be detected to check leakages in the plants.

The section 9 of double facer has, as already described in detail, at least one motor for drawing the corrugated board N through the section 9, sliding on the double facer 8. In some embodiments, more than one motor can be also provided. Each motor can constitute a functional unit in the meaning intended herein. It can be controlled, as regards the predictive diagnostics, based on the absorbed current as relevant operational parameter. As already described, this operational parameter can be correlated with a further operational parameter, for example the pressure at which the corrugated board N is pressed against the double facer 8. In some cases, the pressure can depend on the thickness of the corrugated board, and in this case thickness can also be used as additional parameter correlated to the current absorbed by the motor.

The section 9 has further functional units. In particular, each hot plate 8, or groups of hot plates 8, can constitute functional units. These functional units can be associated with one or more operational parameters that can be used within a predictive diagnostics process as described herein. Operational parameters of the double facer can be: temperature, steam flow rate, or flow rate of other heat-transferring fluid, with which the hot plates are heated; supplied thermal power.

As already indicated with reference to the unwinder, the corrugator and the gluers, also in double facer section 9 other operational parameters can be controlled, such as vibrations and parameters related to pressurized air. Vibrations can be detected and monitored to highlight anomalies correlated with incipient faults of the bearings of the rotating members, of the motion transmission members (chains, belts, gears), and in general of all the moving members. Parameters correlated with the pressurized air, such as pressure and flow rate, can be detected to check leakages in the plants.

The waste removal section 11 can comprise a transverse shearer with one or more motors. As described with reference to section 62, also the motors of the shearer of section 11 can be intended as functional units controlled by the predictive diagnostics system. The operational parameter can be the current absorbed by the motor. A further correlated parameter can be the feeding speed $V_N$.

Also in section 11 sensors can be provided for detecting the vibrations and/or parameters of the pressurized air, for the same purposes described with reference to the unwinders, corrugators, gluers and double facer, i.e. for determining incipient faults of moving members, such as chains, belts, or other motion transmission members, supports or bearings, etc.

Each of the sections 13 (slitter-scorer) and the section 17 (conveyors) comprise a plurality of electric motors and other movable members. Each of these components can be intended as a functional unit and can be subject to a predictive diagnostics control as described above. An operational parameter of each actuator can be an electric parameter correlated with the absorbed power, for example the absorbed current. In general, as described in detail for the shearers 62A, 62B, each electric motor can be controlled by using an operational parameter for example indicative of the absorbed power. For some actuators, a further operational correlated parameter can be taken into account, for example the feeding speed $V_N$ of the corrugated board, the cut length, features of the corrugated board, such as thickness, number of layers forming it, number of sheets for each stack formed on collection planes 63, 65, etc.

Also in sections 13, 15, and 17 sensors can be provided for detecting the vibrations and/or parameters of the pressurized air, for the same purposes described with reference to the unwinders, corrugators, gluers and double facer, i.e. for determining incipient faults of moving members, such as chains, belts, or other motion transmission members, supports or bearings, etc.

In section 13 temperature sensors can be provided, for example, for detecting the temperature of the longitudinal slitting knives and/or the scorer tools. Anomalous increases in the temperature can be indicative of an excessive wear of the slitting and scoring tools. Anomalies in the parameter "temperature" can be therefore used for predicting the need of replacing the tools.

Each member of the plant 1 that is subject to vibrations can be also monitored through accelerometers or vibration sensors, in order to detect any anomaly in operation that can entail a change in intensity, frequency or in other parameters of the vibrations. Each member subject to vibration can be considered as a functional unit and one or more parameters related to vibrations, such as the intensity and/or the frequency thereof, can be considered as operational parameters of the functional unit. In some embodiments, more components can be grouped and monitored, as single functional unit, through the detection of one or more operational parameters, and correlated parameters, if any. For example, more members of a kinematic chain can be considered as a single functional unit, as well as more supports of one or more rotating members.

The predictive diagnostics method described herein can use one or more parameters related to the mechanical vibration of a member as operational parameter detected and controlled, on which to perform, in real time, the step of learning and detecting, the calculation of the statistical functions and the check of any alterations of the statistical functions with respect to the maximum and minimum values calculated in the learning step. In general, the vibration of each of these mechanical members will be correlated with one or more further operational parameters of the line or section of which the member is part. For example, vibrations can be correlated with the corrugated board feeding speed or the feeding speed of the single paper sheets composing it, and/or the acceleration/deceleration cycles of the moving members, that can be, in turn, a function of the cutting length (L). Vibrations can be also affected by features of the board produced, such as grammage, thickness, number of layers composing it. One or more of these parameters can be used as parameters correlated with the main operational parameter, for example the frequency or intensity of vibration, with criteria analogous to those described above with reference to the cutting length (L) or to the pressure on the corrugated board as further correlated parameter for controlling the shearer 62A, 62B and in the double facer section 9, respectively.

In the above description it has been assumed to acquire, in an interval variable over time, the values of one or more quantities, of which one or more values of corresponding statistical functions are then calculated. Based on the maximum and minimum values of one or more statistical quantities, diagnostics is performed by comparing the values acquired in the learning interval with the current or actual values of the same statistical variables calculated in an actual time interval. The operation of the functional unit to which the detected statistical quantities refer is right if the value(s) calculated in the current temporal window are within an interval or range around the maximum and minimum values calculated in the learning period.

However, it has been detected that alterations can occur in the operation of a given functional unit, entailing a drift over time of the maximum and minimum values of the statistical functions in question. This drift can be indicative of an incipient fault. The drift could be not detectable with the criteria described above. For example, in the case of a functional unit constituted by, or comprising, an electric motor, the following situation can occur. Due to a malfunction, the motor absorbs, for some time intervals, a current higher than the correct value. The time during which the anomalous absorption occurs and/or the entity of the anomaly can be such as not to trig an alarm, as the value(s) of the statistical functions taken into account (for example, in this case, variance and mean) remain within the tolerance interval around the value deriving from the learning step (FIG. 2B). An anomalous situation of this kind could be therefore not detected by a predictive diagnostics method of the type described above.

In order to have an alarm or diagnostic signal related to an anomalous situation of this type, an acquisition and diagnostic process can be performed of the type described in detail below with reference to FIGS. 9A-9D.

Briefly, the process provides for the following steps: calculating respective maximum and minimum values of at least one statistical function of the operational parameter in a temporal sequence of learning intervals; detecting any drift over time of said maximum and minimum values calculated for the learning intervals of said sequence; in case a drift is detected, signaling any anomaly.

In the detailed description below, it is foreseen to calculate two statistical functions and, in particular, similarly to the exemplary embodiments described above, mean and variance.

In FIGS. 9A-9D frames are shown constituted by the maximum and minimum values of two statistical quantities (in the example variance σ and mean μ again) calculated in learning intervals. Each figure shows a diagram where the abscissae axis shows the value of the mean and the ordinates axis show the value of the variance of the parameter in question, for example a current absorbed by a motor, or a pressurized air flow rate or other.

To detect a slow drift in the statistical quantities, in some embodiments it is possible to proceed as follows. A learning temporal interval of suitable duration is set. Typically, the learning time interval for detecting slow drift of a controlled parameter has a lower duration than the duration of the movable learning temporal window indicated above with $\Delta t_2$ (FIG. 2). In some embodiments, the learning temporal interval can be, for example, one day. The maximum and minimum values of variance and mean (or other statistical function) are calculated on this learning temporal window, for example as previously described with reference to the movable learning temporal window $\Delta t_2$. These values, analogously to what described with reference to FIG. 2B, define a square in diagram μ, σ.

In FIG. 9A four squares are shown, indicated with Q1, Q2, Q3, Q4, defined by the maximum and minimum values of means and variance calculated on four distinct learning intervals. In FIG. 9B an envelope square is shown, containing all the squares Q1, Q2, Q3, Q4.

If the functional unit, on which the controlled parameter is detected, operates correctly and is not subject to a slow drift, subsequent squares defined by maximum and minimum values of variance and mean calculated on subsequent learning intervals fall within the envelope square QE. In other words, the envelope square QE in the diagram $\mu$, $\sigma$ tends to have constant dimensions and position.

Vice versa, if the values of mean and variance have a slow drift, the situation schematically illustrated in FIGS. 9C and 9D occurs. Squares Q5, Q6, Q7 defined by the maximum and minimum values of $\mu$, $\sigma$, calculated on subsequent acquiring temporal intervals, gradually move outside the original envelope QE, i.e. the envelope square QE increases in dimension or changes position in the diagram $\mu$, $\sigma$. If the envelope QE is calculated, for instance, based on a finished number of squares Qi, every time a new square Qi is calculated based on the maximum and minimum values of variance and mean calculated on a more recent learning interval, the oldest of the previously calculated squares Qi is deleted from the envelope QE. With reference to the trend of the drift represented by the squares Q5, Q6, Q7 of FIGS. 9C and 9D, if the envelope square QE is determined based on the last four calculated squares Qi, in FIG. 9E the envelope QE1 is shown, obtained from the squares Q2, Q3, Q4, Q5, the square Q1 (the oldest one among those shown in FIG. 9A, 9B) being rejected. In FIG. the envelope square QE2 is shown, calculated on the squares Q4, Q5, Q6, Q7, whilst the squares Q1, Q2, Q3 have been rejected. In FIGS. 9B, 9E, 9F it is clearly apparent that the envelope square changes in position and dimensions in the diagram $\mu$, $\sigma$ due to the slow drift of the minimum and maximum values of mean and variance.

This anomalous situation can be detected and trig an alarm signal. The displacement of the squares Qi in the diagram $\mu$, $\sigma$ and therefore the change in shape and position of the envelope QE, can give a qualitative indication that can be indicative of the type of incipient fault causing the slow drift of the values mean and variance of the controlled parameter.

A system of the type described above can interface a local IT network, allowing an operator to control one or more lines inside a same plant or more plants. A production line provided with the above-cited diagnostics system can be also connected to a remote control unit, for example through a communication portal. It is also possible to transmit alarm signals, diagnostics messages or other information, obtainable from the data processed as described above, via email, short message services or other message systems on local or remote computers, or on movable devices such as mobile phones or tablets.

The invention claimed is:

1. A method for monitoring operation of a corrugated board production plant, the production plant comprising a plurality of functional units requiring predictive diagnostics; the method comprising steps as follows:
   detecting at least one operational parameter of at least one functional unit of the plurality of functional units forming part of the production plant, said at least one operational parameter relating to operation of the at least one functional unit and being indicative of functioning of the at least one functional unit, and calculating a current value of at least a first statistical function and a second statistical function of said at least one operational parameter in a current temporal window;
   calculating a maximum value and a minimum value of each of the at least the first statistical function and the second statistical function based on historicized data of the at least one operational parameter;
   comparing a current value of the at least the first statistical function and the second statistical function with said maximum value and said minimum value of each of said at least the first statistical function and the second statistical function calculated on said historicized data;
   based on a result of said comparing, generating a piece of information of predictive diagnostics regarding said at least one functional unit, said piece of information indicating whether the at least one functional unit of said plurality of functional units of said corrugated board production plant requires replacement, maintenance or repair intervention.

2. The method of claim 1, wherein the historicized data of the at least one operational parameter are data contained in a movable learning temporal window, temporally preceding the current temporal window.

3. The method of claim 2, wherein duration of the learning temporal window is longer than duration of the current temporal window or is equal to a multiple of the duration of the current temporal window.

4. The method according to claim 2, wherein the maximum value and the minimum value of at least one of said first statistical function and said second statistical function are determined as the maximum value and the minimum value of a corresponding statistical function calculated on a plurality of temporal windows for calculating a statistical function that are contained within the movable learning temporal window.

5. The method of claim 2, wherein the movable learning temporal window is distanced from the current temporal window by a time interval comprised between the movable learning temporal window and the current temporal window.

6. The method of claim 5, wherein the time interval comprised between the current temporal window and the movable learning temporal window has a fixed or variable duration.

7. The method according to claim 1, wherein the calculating of the maximum value and the minimum value of the at least the first statistical function and the second statistical function on historicized data of the at least one operational parameter comprises steps as follows:
   calculating the current value of at least one of said first statistical function and said second statistical function for each temporal window of a sequence of temporal windows for calculating the statistical function contained within the movable learning temporal window or into which the movable learning temporal window is subdivided;
   determining the maximum value and the minimum value of the first statistical function or of the second statistical function among the values of the statistical function calculated for said sequence of temporal windows for calculating the statistical function contained within the movable learning temporal window.

8. The method of claim 1, wherein one of the first statistical function and the second statistical function is an average value of a parameter in the current temporal window, and the other of the first statistical function or the second statistical function is a variance of the parameter in the current temporal window.

9. The method of claim 1, wherein the at least one operational parameter is correlated with at least one further parameter of the functional unit.

10. The method of claim 9, wherein the historicized data of the at least one operational parameter comprise a plurality of values of the at least one operational parameter for each of different values of the at least one further parameter of the at least one functional unit.

11. The method of claim 1, further comprising steps of: calculating respective maximum and minimum values of at least one statistical function of the at least one operational parameter in a temporal sequence of learning intervals; detecting any drift over time of said maximum and minimum values calculated for the learning intervals of said sequence; and, in case a drift is detected, signaling an anomaly.

12. A method for monitoring operation of a corrugated board production plant, the production plant comprising a plurality of functional units requiring predictive diagnostics; the method comprising steps as follows:
  (a) calculating a maximum value and a minimum value of a statistical function of an operational parameter of at least one functional unit of said plurality of functional units forming part of the production plant, said at least one operational parameter relating to operation of the at least one functional unit and being indicative of functioning of the at least one functional unit, in a movable learning temporal window;
  (b) calculating a current value of the statistical function of the operational parameter of the at least one functional unit in a current temporal window, temporally following and distanced from the movable learning temporal window;
  (c) comparing the current value of the statistical function with the maximum value and the minimum value of the statistical function calculated on the movable learning temporal window;
  (d) based on a result of said comparing, generating a piece of information of predictive diagnostics regarding said at least one functional unit, said piece of information indicating whether the at least one functional unit requires replacement, maintenance or repair intervention;
  (e) time-translating the movable learning temporal window and the current temporal window;
  (f) repeating steps (a) to (e).

13. A plant for producing corrugated board, the plant comprising: one or more corrugators; at least one double facer section; a dry-end; a data processing and control system, which include a plurality of functional units requiring predictive diagnostics and are configured to implement a method comprising steps as follows:
  detecting at least one operational parameter of at least one functional unit of said plurality of functional units forming part of the plant and calculating a current value of at least a first statistical function and a second statistical function of said at least one operational parameter in a current temporal window, said at least one operational parameter relating to operation of the at least one functional unit and being indicative of functioning of the at least one functional unit;
  calculating a maximum value and a minimum value of each of the at least the first statistical function and the second statistical function based on historicized data of the at least one operational parameter;
  comparing the current value of the at least the first statistical function and the second statistical function with said maximum value and said minimum value of said at least the first statistical function and the second statistical function calculated on said historicized data;
  based on a result of said comparing, generating a piece of information of predictive diagnostics regarding said at least one functional unit, said piece of information indicating whether the at least one functional unit of said plurality of functional units of said corrugated board production plant requires replacement, maintenance or repair intervention.

14. A non-transitory computer readable data support comprising one or more programs executable in a machine or IT system, configured to implement a method comprising steps as follows:
  detecting at least one operational parameter of at least one functional unit forming part of a plant for producing corrugated board wherein said at least one operational parameter relates to operation of the at least one functional unit, and wherein said at least one functional unit requires predictive diagnostics, and calculating a current value of at least a first statistical function and a second statistical function of said at least one operational parameter in a current temporal window;
  calculating a maximum value and a minimum value of each of the at least the first statistical function and the second statistical unit based on historicized data of the at least one operational parameter;
  comparing the current value of said at least the first statistical function and the second statistical function with said maximum value and said minimum value of said at least the first statistical function and the second statistical function calculated on said historicized data;
  based on a result of said comparing, generating a piece of information of predictive diagnostics regarding said at least one functional unit, said piece of information indicating whether the at least one functional unit of said Plurality of functional units of said corrugated board production plant requires replacement, maintenance or repair intervention.

* * * * *